Jan. 10, 1967 E. G. HUDAK ETAL 3,296,909
ROTARY KNIFE CLIPPER
Filed March 3, 1965 6 Sheets-Sheet 1

FIG. 1

INVENTORS
EDWARD G. HUDAK
BY ROBERT A. BROWNING JR.

Hoffmann and Mount
ATTORNEYS

INVENTORS
EDWARD G. HUDAK
ROBERT A. BROWNING JR.
BY Hoffmann and Yourt
ATTORNEYS

FIG. 3

INVENTORS
EDWARD G. HUDAK
ROBERT A. BROWNING JR.
BY Hoffmann and Yount
ATTORNEYS

INVENTORS
EDWARD G. HUDAK
ROBERT A. BROWNING JR.
BY Hoffmann and Yunt
ATTORNEYS

United States Patent Office 3,296,909
Patented Jan. 10, 1967

3,296,909
ROTARY KNIFE CLIPPER
Edward G. Hudak, Painesville, and Robert A. Browning, Jr., Mentor, Ohio, assignors to The Coe Manufacturing Company, Painesville, Ohio, a corporation of Ohio
Filed Mar. 3, 1965, Ser. No. 436,760
9 Claims. (Cl. 83—305)

The present invention relates to a cutting apparatus, and more particularly to a cutting apparatus having one or more rotary knives for cutting moving sheet material, preferably rigid sheet material, transversely of its direction of movement or feed and a drive means for rotating the knife or knives including a mechanism whereby the rotational speed of the knife or knives may be automatically changed during each cycle of operation.

The principal object of the present invention is the provision of a new and improved cutting apparatus, of the character referred to, for cutting moving lengths of sheet material, preferably rigid sheet material, transversely of its direction of movement or feed, and which apparatus is of a compact construction and capable of cutting the material at variable, equally spaced intervals along its length for any given feed speed thereof without damage to the material.

Another object of the present invention is the provision of a new and improved cutting apparatus, of the character referred to, having one or more rotary knives for cutting sheet material, preferably rigid sheet material, transversely of its direction of feed, a drive means for rotating the knife or knives including a mechanism whereby the rotational speed of the knife or knives may be automatically varied for different portions of each cycle of operation, and an adjusting means for the mechanism for changing the magnitude of the speed variation of the rotary knife or knives whereby the peripheral speed of the knife or knives during a cutting operation can be made the same as the speed of the material being cut to thereby prevent damage to the material.

Another object of the present invention is the provision of a new and improved cutting apparatus for cutting moving sheet material, preferably rigid sheet material transversely of its direction of movement or feed, which apparatus has one or more continuously driven rotary knives having relatively small radii and an average peripheral speed during each cycle of operation less than the feed speed of the material to be cut, in combination with means for effecting a cutting operation once per each revolution of the knife or knives or once per multiple revolutions thereof whereby variable and relatively long lengths of material can be cut for any given feed speed thereof, and means for increasing the peripheral speed of the knife or knives during a cutting operation so that during the cutting operation the knife speed is the same as the speed of the material being cut.

Another object of the present invention, is the provision of a new and improved cutting apparatus, of the character referred to, having one or more continuously driven rotary knives for cutting moving sheet material, preferably rigid sheet material, transversely of its direction of movement or feed, and wherein the knives are carried by a carrier on carriers movable toward and from the material to position the knife or knives in either a cutting position in which the knife or knives perform a cutting operation on the material or non-cutting position in which the knife or knives do not contact the material.

Another object of the present invention is the provision of a new and improved cutting apparatus, of the character referred to, having one or more continuously driven rotary knives for cutting sheet material, preferably rigid sheet material, transversely of its direction of feed, and wherein the knife or knives are carried by a carrier or carriers movable toward and from the material to position the knife or knives in either a first cutting position in which the knife or knives effect a severing of the material, a second cutting position in which the knife or knives perform a perforating operation on the material or a third non-cutting position in which the knife or knives do not contact the material.

A still further object of the present invention is the provision of a new and improved cutting apparatus, as defined in the next preceding object, including a control means for automatically and sequentially positioning the knife or knives in various ones of the different knife positions in accordance with a desired operating sequence.

The invention resides in certain constructions and combinations and arrangement of parts and further objects and advantages will be apparent to those skilled in the art to which it relates from the following detailed description of the preferred embodiment described with reference to the accompanying drawings forming a part of this specification and in which the same or similar reference characters designate corresponding parts and in which:

Although the cutting apparatus of the present invention is applicable for cutting various types of sheet material and especially rigid sheet material, it is particularly applicable for cutting moving lengths of plasterboard, hereinafter referred to merely as board, into shorter lengths or at spaced intervals along its length. It is to be understood that the term "cutting" as used in the specification and claims is generic to both a severing and perforating type cutting action.

When cutting moving board with a continuously rotating knife, it is desirable that the peripheral speed of the cutting edge of the knife during a cutting operation be the same or substantially the same as the board being cut. If a one to one speed relationship does not exist during the cutting operation, the knife will "plow" and/or otherwise damage the board. While the desired speed relationship can be attained by uniformly rotating a knife having a radius such that the peripheral or circumferential speed of its cutting edge is equal to the linear speed of the board, such an arrangement is not always satisfactory when the cutting is performed at relatively long intervals along the board because the large radius requirement of such a knife produces a large or bulky apparatus.

The present invention overcomes the above noted disadvantages by utilizing a rotary knife means having a relatively small radius in combination with a drive means for rotating the knife at a relatively slow speed, including a mechanism for increasing the peripheral speed of the knife during a cutting operation to that of the speed of the board being cut. The drive means preferably additionally provides an adjustment for varying the magnitude of the speed increase of the knife during the cutting operation whereby a wide range of board lengths or increments can be fed between successive cutting operations.

The cut-off apparatus shown comprises, in general, a fabricated frame assembly A having a base 12, a pair of laterally spaced vertically extending hollow columns 13 and 14 mounted on the base at one end thereof and a top or crown 16 extending transversely between the columns 13 and 14. The base 12, the vertical columns 13 and 14 and the top 16 define therebetween a generally rectangularly shaped opening 17. The fabricated frame assembly A supports a horizonally disposed vertically adjustable roller table 18 suitably supported adjacent its four corners and extending through the opening 17 for guiding and supporting a length of board 19 as it moves through the cut-off apparatus.

Upper and lower co-operating knife assemblies B and C are disposed on opposite sides of the table 18 between the upright columns 13 and 14. The upper and lower knife assemblies B and C are supported by the frame assembly A for oscillatable movement toward and away from each other, respectively, and comprise upper and lower knife carriers 20 and 21 carrying co-operating rotary knives 24 and 25, respectively, for transversely cutting the board 19 as it is fed therebetween. The knives 24 and 25 operate in a gap 26 in the roller table 18. The cut-off apparatus additionally comprises a drive mechanism D for simultaneously rotating the upper and lower knives 24 and 25 in opposite directions and knife positioning mechanisms E and F operatively connected with the carriers 20 and 21 to oscillate the same and position the knives 24 and 25 between a cutting position in which a severing of the board is effected, a perforating position in which a partial depth cut or a perforation of the board is effected and a retracted position in which the knives make no contact with the board, respectively.

The table 18 for supporting and guiding the board 19 as it is moved through the cut-off apparatus comprises a generally rectangular frame 30 having a pair of laterally spaced side members 32 and 33 extending through the opening 17 and rectangularly shaped tubular end or cross members 34 and 35 extending transversely of the side members 32 and 33 at their ends and projecting laterally beyond the sides thereof. The table 18 further comprises a plurality of longitudally spaced rollers 36 extending transversely between the side members 32 and 33 and having their opposite ends rotatably supported by the side members 32 and 33 for supporting the board as it moves through the cutoff apparatus with minimum amount of frictional contact. The table adjacent the knives 24 and 25 is devoid of rollers and is provided with a pair of oppositely facing skid plates 37 and 38 which with the side members 32 and 33 define the gap 26.

Figure 2:
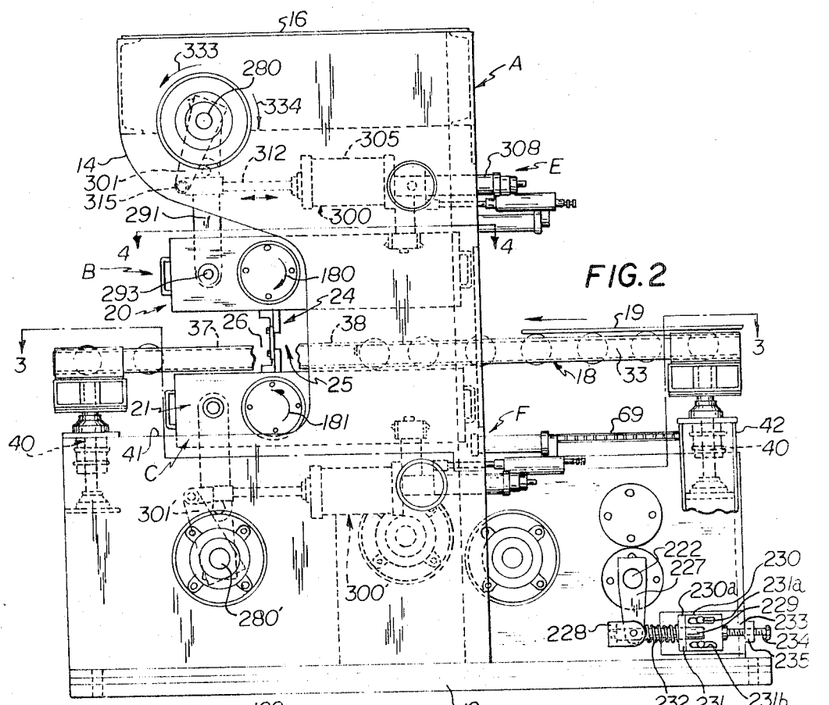
FIG. 2 is a fragmentary side elevational view of the apparatus shown in FIG. 1 looking from the right.

The table 18 is supported adjacent each of its four corners by an adjustable support means 40 for vertically raising or lowering the table 18 so that boards having different thicknesses can be centered midway between the top and bottom knife assemblies B and C, respectively. The adjustable support means 40 at the two leftmost corners, as viewed in FIG. 2, are supported on horizontally extending side portions 41 of the upright columns 13 and 14 and at the two right most corners are supported by upright fabricated supports 42 and 43 mounted on the base 12. The upright columns 13 and 14 are cut back adjacent their midportion along their left side, as viewed in FIG. 2, to form the generally horizontally disposed side portions 41. Since all of the adjustable support means 40 for supporting the table 18 are identical, only the adjustable support means 40 for supprting the upper right corner of the table, as viewed in FIG. 3, will be described in detail.

Figures 6, 9:
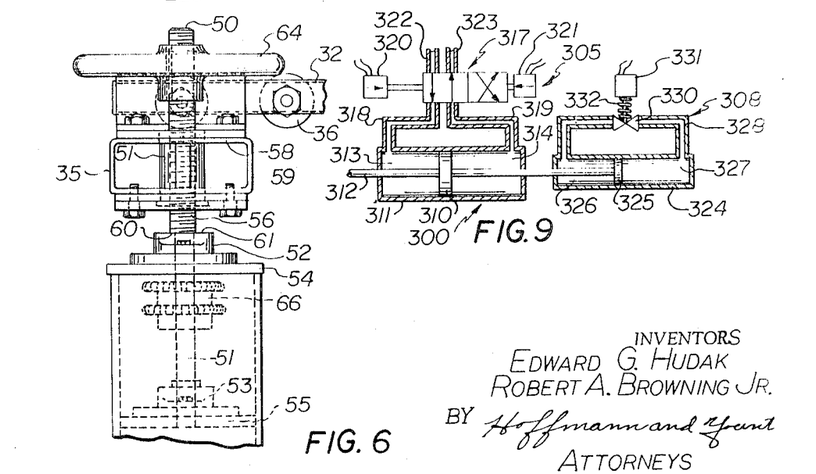
FIG. 6 is a fragmentary side elevational view looking in the direction of the arrows on line 6—6 of FIG. 3.
FIG. 9 is a schematic illustration of part of the cutting apparatus shown in FIG. 1.

Referring to FIG. 6, the adjustable support means 40 comprises a vertically extending rod 50 having a lower unthreaded portion 51 rotatably supported by a pair of vertically spaced bearing or bushings 52 and 53 mounted on spaced horizontally disposed plates 54 and 55, respectively, of the upright support 43 and an upper threaded portion 56 extending above the upright support 43 and threadably engaged with a stationary threaded bushing means 57 suitably secured within the laterally projecting portion of the tubular end member 34 and extending between its upper and lower walls 58 and 59. The plate 54 and the upper and lower walls 58 and 59 of the end member 34 are provided with suitable apertures through which the rod 50 extends. The unthreaded portion 51 of the rod 50 is of a smaller diameter than the threaded portion 56 and the two portions at their juncture define an annular shoulder 60 which engages an annular thrust engaging end 61 on the bearing or bushing 52 for the purpose of supporting the table in a vertically spaced relation from the support 43. From the foregoing, it is apparent that the threaded engagement between the rod 50 and the stationary bushing means 57 will cause a movement of the table 18 in a vertical direction when the rod 50 is rotated.

A suitable drive means 63 is provided for simultaneously rotating the rods 50 of each of the adjustable support means 40 and thereby vertically raise and lower the entire table 18. The drive means 63 comprises a handwheel 64 fixed to the threaded portion 56 of one of the rods 50 projecting above the end member 35 and means 65 for operatively interconnecting all of the rods 50 for simultaneous rotation. In the embodiment shown, the hand wheel 64 is connected to the rod 50 in the upper right hand corner, as viewed in FIG. 2. The means 65 comprises a sprocket wheel 66 fixed to the unthreaded portion 51 of each of the rods 50 and a plurality of sprocket chains 67–69 trained around adjacent ones of the sprocket wheels 66. The upright supports 42 and 43 are provided with an open side and the columns 13 and 14 are provided with suitable openings through which the sprocket chains 67–69 extend.

The knife assemblies B and C are identical in construction and therefore, only the upper knife assembly B will be described in detail. As previously mentioned, the knife assembly B comprises a knife carrier 20 for rotatably supporting the knife 24. The knife carrier 20 comprises a rectangular fabricated frame 70 disposed between the columns 13 and 14 and pivotally connected to the columns adjacent to its right end, as viewed in FIG. 2. The frame 70 includes a pair of laterally spaced parallel sides 71 and 72 and a pair of parallel end or cross members 73 and 74, suitably secured to the adjacent ends of the sides 71 and 72 and extending perpendicularly therebetween. Each of the sides 71 and 72 includes a pair of upright laterally spaced parallel walls 75 and 76.

Figures 4, 5:
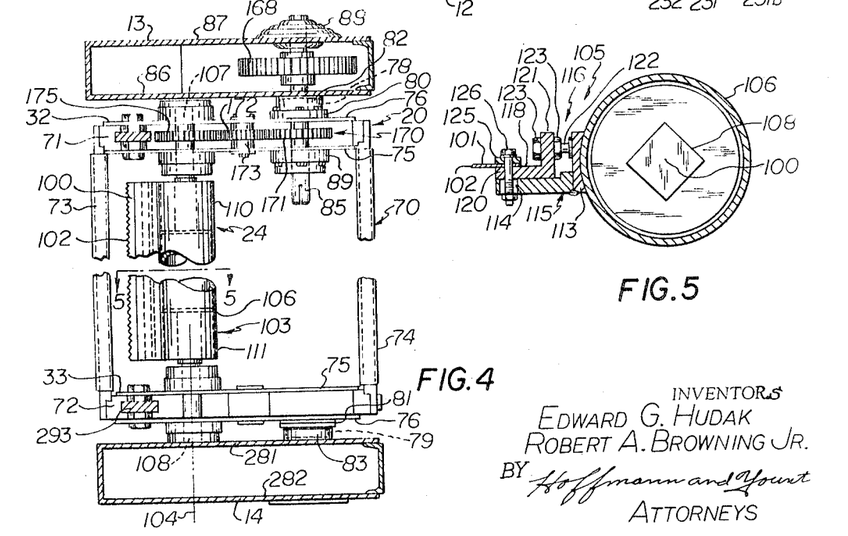
FIG. 4 is a fragmentary sectional view taken approximately along lines 4—4 of FIG. 2.
FIG. 5 is a sectional view taken approximately along lines 5—5 of FIG. 4.

As best shown in FIG. 4, the carrier 24 is pivotally connected to the columns 13 and 14 adjacent its right end by pivot pins or stub shafts 78 and 79 carried by plates 80 and 81 bolted to the wall 76 of the sides 71 and 72 and which are rotatably received within suitable bushings or bearings 82 and 83 rigidly secured to the columns 13 and 14, respectively. The pin or stub shaft 78 has a central aperture therethrough through which a shaft 85 projects, which shaft also projects through aligned apertures in the inner and outer walls 86 and 87 of the hollow column 14 and the walls 75 and 76 of the side 71. The shaft 85 is rotatably supported by suitable bushing or bearings 88 and 89 mounted on the wall 86 of the column 14 and the wall 75 of the side 71, respectively. The shaft 85 comprises a part of the drive means D for rotating the knife 20. The carrier 24 is supported adjacent its left end, as viewed in FIG. 2, by the knife positioning mechanism E and in a manner hereinafter fully described.

The rotary knife 24 comprises an elongated straight flat blade 100 having a serrated cutting edge 102 connected to a knife blade holder assembly 103 supported for rotation about a horizontal axis 104 extending perpendicularly to the direction of movement or feed of the material by the sides 71 and 72 of the carrier 24. The knife blades 100 are preferably tapered or beveled adjacent the cutting edges 102 along their sides facing toward the skid plate 38, when in the position shown in FIG. 2. The knife blade holder assembly 103 comprises a hollow cylindrical member 106 having shafts 107 and 108 suitably secured within its ends 110 and 111 and projecting axially thereof through aligned apertures within the walls 75 and 76 of the sides 71 and 72, respectively. The shafts 107 and 108 are rotatably supported by suitable bearings mounted on the walls 75 and 76 of the sides 71 and 72. The knife blade holder assembly 103 further comprises an elongated bar 113 suitably secured to the cylinder member 106 and extending lengthwise thereof. Welded along one side of the bar 113 is a flange 114 which extends perpendicularly thereto. The bar and flange together comprise a generally L-shaped member 115.

The holder assembly 103 additionally comprises an adjustable blade holder means 116 supported by the L-shaped member 115 for adjustably positioning the blade 100 in a radial direction and for varying the radius of the rotary knife 24. The adjustable blade holder means 116 comprises an L-shaped member 118 having one flange 120 thereof slidably engaged with the flange 114 and the other flange 121 thereof spaced from the bar 113. The bar 113 is provided with a plurality of longitudinally spaced threaded members 122 fixed thereto and which project through aligned apertures in the flange 121 of the L-shaped member. A pair of nuts 123 threadably engaged with the members 122 and disposed on opposite sides of the flange 121 are provided to adjustably clamp the flange 121 of the L-shaped member 118 to the members 122. The blade 100 is clamped between the flange 120 and an elongated plate or bar 125 by a plurality of bolts 126 which extend through aligned apertures in the plate 125, the blade 100, the flanges 114 and 120. The aperture in the flange 120 is a slot 127 to enable the member 118 to be moved relative to the bar 113.

From the above, it is apparent that changes in the radial position of the blade 100 or in the radius of the knife 24 can be readily effected by loosening the nuts 123 and moving the L-shaped member 118 relative to the member 115 toward and away from the axis of rotation 104 of the knife 24. The provision of an adjustable blade holder means 116 enables the blades 100 of the co-operating knives 24 and 25 to be adjusted for proper clearance therebetween, resharpened and reused after the cutting edge 102 thereof becomes dull or worn, variations in the width of different blades being compensated for by moving the adjustable blade holder means 116 toward or from the axes 104 of the knives 24 and 25.

The drive means D for simultaneously rotating the knives 24 and 25 comprises a suitable power source (not shown) operatively connected to an input shaft 130 of an infinite variable speed change transmission 131 of any suitable or conventional construction. The speed change transmission 131 has an output shaft 132 which is drivingly connected to an input shaft 133 of a speed reduction unit 134 by a sprocket chain 135 trained around sprocket wheels fixed to the shafts 132 and 133. The speed reduction unit 134 has an output shaft 138 which is drivingly connected to an input shaft 140 of a differential drive arrangement or planetary transmission 141 by a conventional coupling 142. The input shaft 140 is supported for rotation by a pair of bearings 145 and 146 secured to a pair of laterally spaced walls 147 and 148 of a gear box or housing 150 mounted on the base 12, respectively.

Fixed to the input shaft 140 at its end remote from the coupling 142 is a bevel gear 152 forming a part of the differential drive arrangement 141 and which may be said to comprise the input gear thereof. The bevel gear 152 is in constant mesh with a bevel gear 154 supported for rotation about an axis extending perpendicular to the axis of rotation of the bevel gear 152. The bevel gear 154 is also in constant mesh with a bevel gear 156 fixed to an output shaft 158 of the differential drive arrangement 141. The output shaft 158, whose axis is aligned with the axis of the input shaft, is rotatably supported by suitable bearings 160 and 161 secured to the inner and outer walls 86 and 87 of the column 13, respectively. The bevel gears 152, 154 and 156 are all part of the differential arrangement or planetary transmission 141 and may be said to comprise the drive or sun, the follower or planet, and the output or orbit gears thereof, respectively.

The output shaft 158 is operatively connected to the shafts 85, which extend through the sides 71 of the carriers 20 and 21 of the knife assemblies B and C, respectively, by a gear train 165, comprising a spur gear 166 fixed to the output shaft 158 intermediate the walls 86 and 87 of the column 13 the gear 166 is in constant mesh with a spur gear 167 fixed to the shaft 85 for the knife assembly C, the latter gear 167 in turn being in constant mesh with a spur gear 168 fixed to the shaft 85 for the knife assembly B. The spur gears 167 and 168 have equal diameters whereby both are rotated at the same rotational speed.

The knives 24 and 25 are drivingly interconnected with their respective shafts 85, by gear trains 170 housed within the spaced walls 75 and 76 of the sides 71 of the carriers 20 and 21. Since both gear trains 170 are of an identical construction, only the gear train 170 carried by the carrier 24 will be described in detail. The gear train 170 comprises a spur gear 171 fixed to the shaft 85 which is in constant mesh with an idler gear 172 rotatably journaled on a stub shaft 173 secured between the walls 75 and 76 of the side 71 of the carrier 24. In constant mesh with the idler gear 172 is a spur gear 175 fixed to the shaft 107 of the knife blade holder assembly 103. Portions of the shafts 107 and 108 within the ends 110 and 111 of the cylinder 106 are square and engage a square aperture in the end of the member 106 to provide a driving connection therebetween.

From the foregoing description of the drive means D, it is apparent that the two knives 24 and 25 will be rotated simultaneously in opposite directions and at the same speeds, since both of the spur gears 167 and 168, which are in constant mesh with one another, are of the same diameter and operatively interconnected with the knives 24 and 25, respectively, by identical gear trains 170. The speed of the knives 24 and 25 can be varied by either changing the speed ratio of the infinite variable speed transmission 131 or by providing a variable speed input power source.

Figure 1:
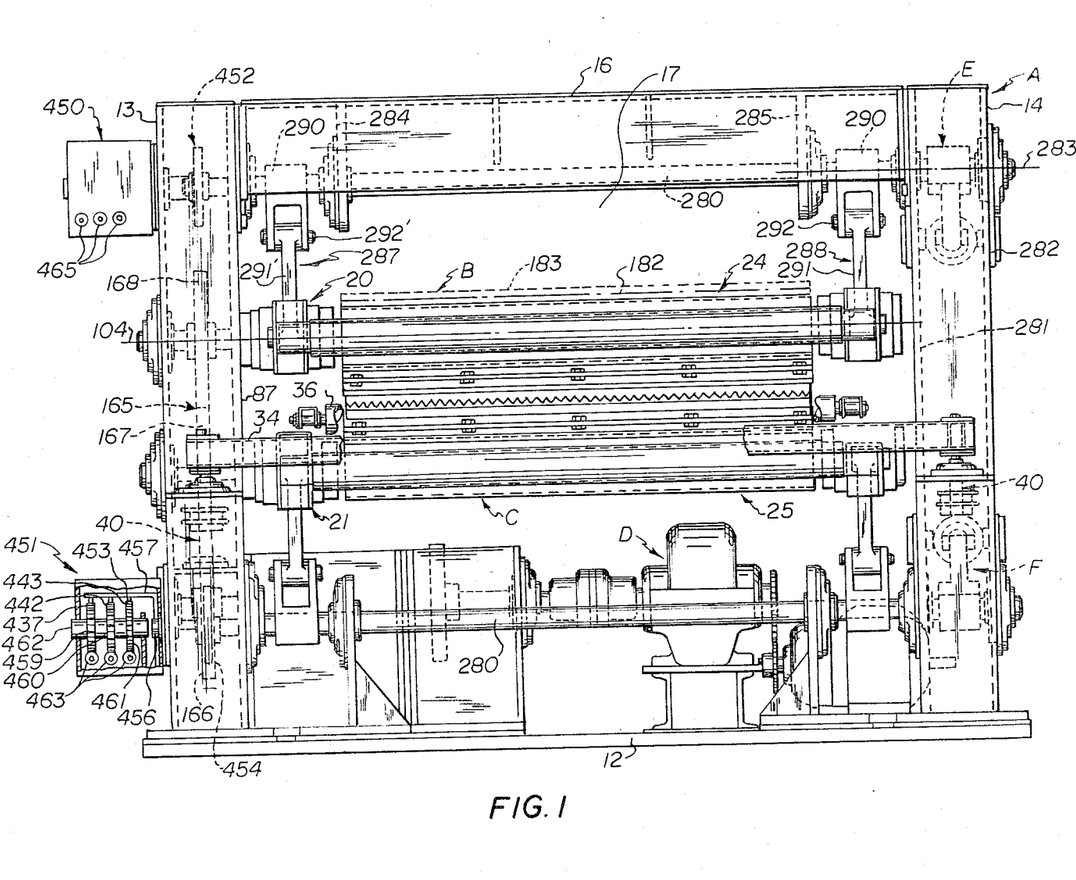
FIG. 1 is a fragmentary front elevational view of a cut-off apparatus embodying the present invention.

The board 19 to be cut moves from right to left, as viewed in FIG. 2, and the rotary knives 24 and 25 are rotated in opposite directions, the upper knife 24 being rotated in a clockwise direction, as indicated by the arrow 180, and the lower knife 25 in a counterclockwise direction, as indicated by the arrow 181. When the knife assemblies B and C are in the position indicated by the solid lines in FIGS. 1 and 2, and the upper blade is in a top dead center position the serrated cutting edges 102 of the blades 100 of the knives 24 and 25 are interdigitated with one another and co-operate to effect a severing of the board 19. When the knife assemblies B and C are in a position such as that indicated by the phantom line 182 in FIG. 1, and the upper blade 100 is in a bottom dead center position and the lower blade 100 is in a top dead center position the serrated cutting edges 102 of the knives 24 and 25 are only partially interdigitated with one another and co-operate to effect a perforation of the board 19. When the knife assemblies B and C are in a position such as that indicated by the dotted line 183 in FIG. 1, the serrated cutting edges 102 of the blades 100 of the knives 24 and 25 do not make contact with the board 19 as they pass through their bottom dead center and top dead center positions, respectively.

When the cut-off apparatus is used in conjunction with a conveyor which feeds lengths of board, the infinite variable speed transmission 131 may be driven from the feed conveyor or from the power source that is driving the feed conveyor. The length of board fed per each revolution of the knives 24 and 25 depends upon the linear feed speed of the board and the rotational speed of the knives 24 and 25. However, for any given feed speed, the length of board 19 per each revolution of the knives 24 and 25 can be varied by changing the speed ratio of the infinite variable speed transmission 131, which in turn changes the rotational speed of the knives 24 and 25.

When the cut-off apparatus of the present invention is driven directly from the same power source that is driving the feed conveyor, that is, in timed relation with the feed conveyor, the drive means D will effect a rotational speed change for the knives 24 and 25 which is proportional to any change in the linear feed speed of the board effected by the feed conveyor. In other words, once the rotational speed of the knives 24 and 25 is set by the infinite variable speed transmission 131 so that they make one revolution per predetermined length or increment of board 19 fed, any subsequent change in the feed speed of the board will result in a change in the rotational speed of the knives 24 and 25 which is proportional thereto so that the knives will continue to make one revolution per each increment or length of board fed.

The drive means D includes a speed accelerating and decelerating mechanism operatively connected with the follower gear 154 of the differential drive arrangement 141, for permitting the rotational speed of the knives 24 and 25 to be varied, when desirable during different portions of each revolution or multiple revolutions so that the average peripheral speed of the knife or knives can be slow compared to the linear speed of the material to be cut but when performing a cutting operation can be made the same as the linear feed speed of the board being cut. The speed accelerating and decelerating mechanism shown and designated generally by reference numeral 200 causes the follower gear 154 to be swung or rotated about the axis of the gears 152 and 156 to increase the speed of the output gear 156 and hence, the rotational speed of the knives 24 and 25 during that angular portion of each revolution of the knives at which a cutting operation is effected if the knives 24 and 25 decrease the speed of the output gear 156 and hence, the rotational speed of the knives 20 and 21 during the other or remaining portion of each revolution thereof so as to maintain the relationship of one revolution of the knives 24 and 25 predetermined increment of board length fed.

Figures 7, 8:
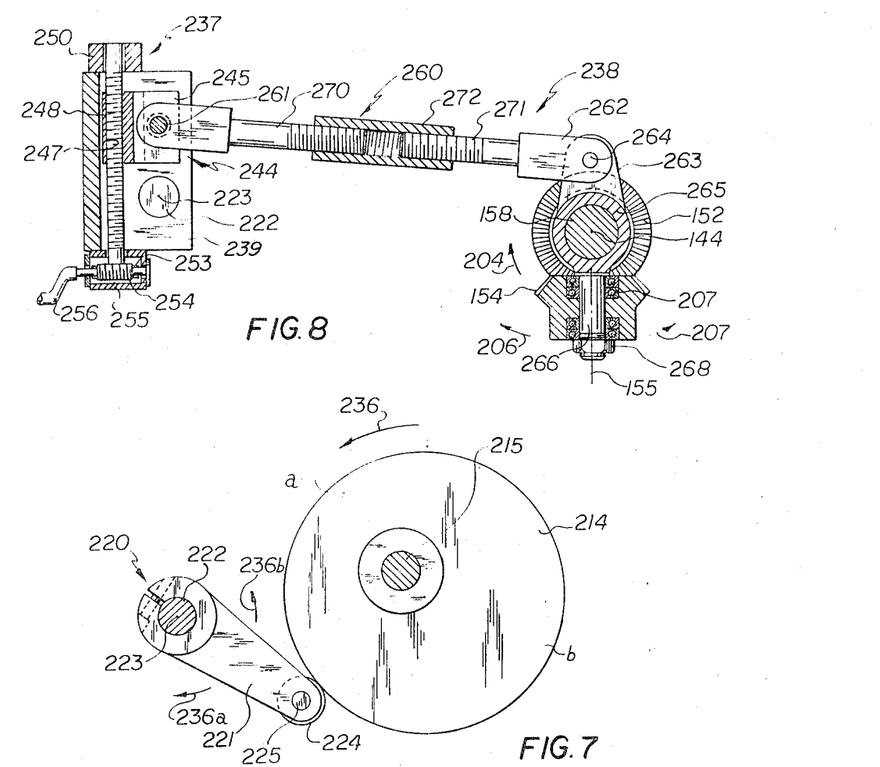
FIG. 7 is a fragmentary sectional view taken approximately along lines 7—7 of FIG. 3.
FIG. 8 is a fragmentary sectional view taken approximately along lines 8—8 of FIG. 3.

As shown in FIG. 8, the input gear 152 of the differential drive arrangement 141 is adapted to be rotated in the direction indicated by the arrow 204. Rotation of the input gear in that direction causes rotation of the output gear 156 in the opposite direction, that is, in the direction of the arrow 105. Since the gears 152 and 156 are the same, if the axis of the follower gear 154 remains stationary, a direct driving relationship is effected between the input and output gears 152 and 156 such that the speed of rotation of both of the input and output gears 152 and 156 is the same. However, if the axis of the follower gear 154 is swung or moved about the axis of the gears 152 and 156 in a direction indicated by the arrow 206, the output gear 156 is rotated, during the swinging movement of the follower gear 154, at rotational speed which is greater than the rotational speed of the input gear 152 because the movement of the follower gear 154 is cumulative or additive to the speed of rotation of the input gear 152. Likewise, when the follower gear 154 is swung or moved about the axis of the gears 152 and 153 in a direction indicated by the arrow 207, the output gear 156, during the swinging movement of the follower gear 154, is rotated at a speed which is less than the speed of the input gear 152.

The speed accelerating and decelerating mechanism 200 for varying the rotational speed of the knives 24 and 25 comprises a cam assembly 210 for causing a swinging movement of the follower gear 154 about the axis of rotation of the gears 152 and 156 and an adjustable motion transmitting means 212 disposed between the cam assembly 210 and the follower gear 154 for varying the extent of the swinging movement of the follower gear 154 and the consequent magnitude of the speed increase for the knives 24 and 25.

The cam assembly 210 comprises an annular cam 214 eccentrically fixed to a shaft 215 rotatably supported by suitable bearings 216 and 217 secured to the spaced walls 147 and 148 of the gear box 150, respectively. The shaft 215 is rotated by a simple gear drive comprising a spur gear 218 fixed to the shaft 140 which is in constant mesh with the spur gear 219 fixed to the shaft 215. The cam assembly 210 further comprises a follower means 220 comprising a bifurcated arm 221 having one end fixed to a shaft 222 supported for rotation about its axis 223 by suitable bushings or bearings mounted on the laterally spaced walls 147 and 148 of the gear box 150 and a cam follower roller 224 rotatably connected to the other or bifurcated end of the arm 221 by a pin 225.

The cam assembly 210 additionally comprises a suitable biasing means 226 for maintaining the cam follower roller 224 in constant engagement with the annular peripheral surface of the cam 214. The biasing means 226 comprises an arm 227, see FIG. 2, having one end fixed to the shaft 222 and its other end pivotally connected to the laterally spaced legs of a U-shaped member 228. The biasing means 226 further comprises a rod 229 having one end secured to the bottom wall of the U-shaped member 228 and the other end slidably disposed within an oversized aperture 230 in one flange 230a of an L-shaped member 231. The member 231 is slidably connected to the wall 147 of the gear box 150 by a pair of bolts 231a which project through slots 231b in the other flange thereof. The provision of the slotted connection permits the U-shaped member to be slidably moved relative to the wall 147. A compression spring 232 slidably disposed on the rod 229 and having its opposite ends in engagement with the bottom wall of the U-shaped member 228 and the flange 230a of the L-shaped member 231 biases the arm 227 in a clockwise direction, as viewed in FIG. 2, which in turn causes the cam follower means 220 to be held in engagement with the cam 214. A threaded member 234 threadably engaged with a member 235 fixed to the side 147 of the gear box 150 and having one end in engagement with the other flange of the L-shaped member 231 provides adjustable means for positioning the member 231 relative to the gear box to vary the compressive force exerted by the spring 232.

Figure 3:
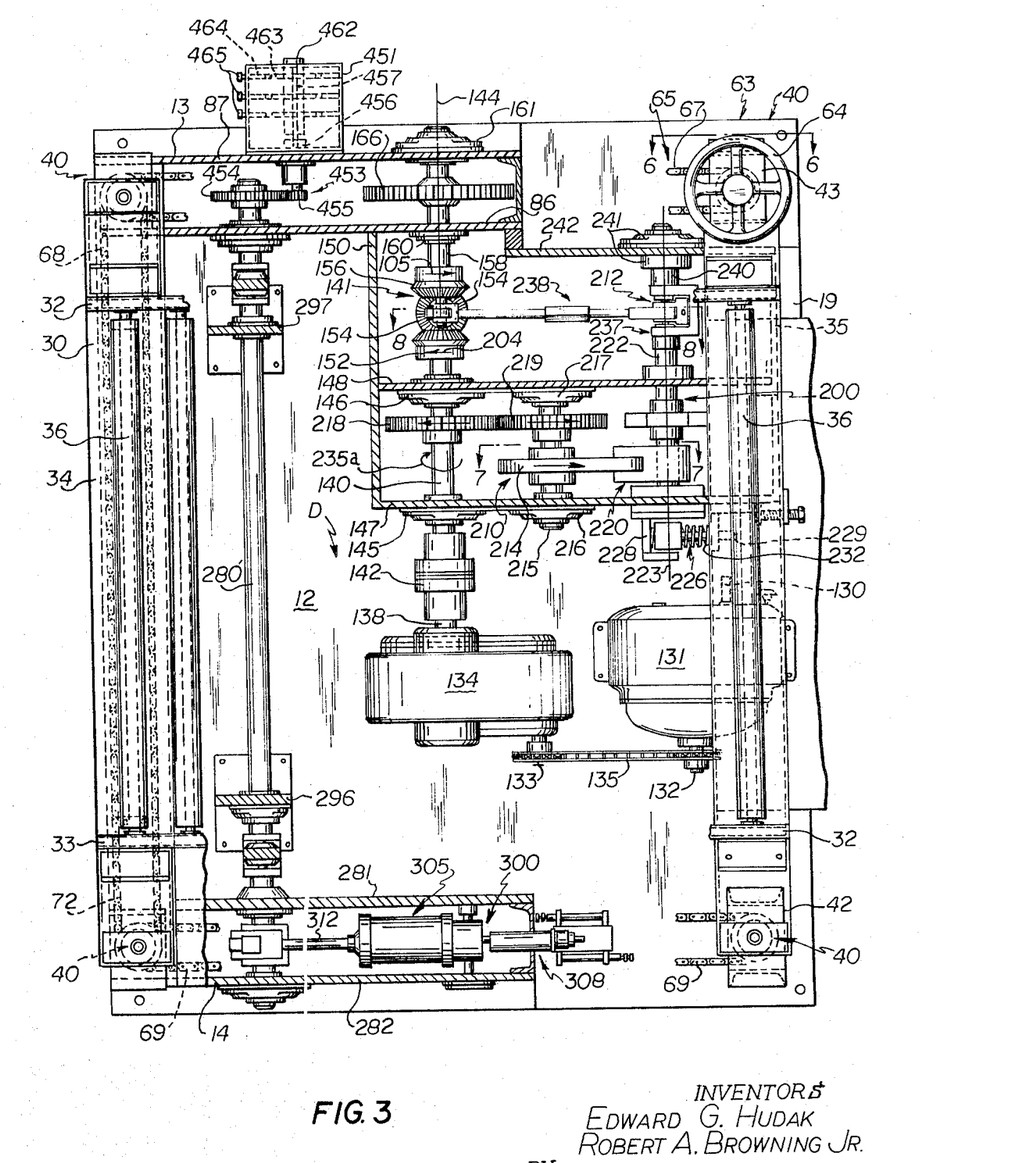
FIG. 3 is a sectional view taken approximately along lines 3—3 of FIG. 2.

Rotation of the input shaft 140 in the direction indicated by the arrow 235a in FIG. 3 causes the cam 214 to rotate in the direction indicated by the arrow 236 in FIG. 7. Since the cam 214 is circular and eccentrically mounted on the shaft 215, it causes the follower arm 221 to be swung and the shaft 222 to which it is connected to be rotated about the axis 223 in the direction indicated by the arrow 236a and at a progressively increasing rate of speed when rotated with the cam follower 224 engaging its surface between its low and high points a and b, respectively. When the cam follower engages the cam surface between high and low points b and a, respectively, the follower arm is swung and the shaft 222 is rotated about the axis 223 in the direction indicated by the arrow 236b and at a progressively decreasing rate of speed by the biasing means 226, which urges the follower roller 224 into engagement with the periphery of the cam 214.

The adjustable motion transmitting means 212 comprises an adjustable lever means 237 fixedly connected with the shaft 222 for rocking or swinging movement about the axis 223 and a connecting means 238 operatively interconnected with the lever means 237 and the follower gear 154 for transmitting the swinging movement of the lever means 237 to the follower gear 154. The lever means 237 comprises a U-shaped lever member 239 having one leg thereof fixed to the shaft 222 at its inner end and the other leg thereof fixed to one end of a shaft 240 rotatably supported by suitable bearings 241 mounted on both sides of a wall 242 of the gear box 150. The shafts 222 and 240 are axially aligned and the U-shaped member 239 ist rockable about their axes.

The lever means 237 further comprises means 244 for adjusting the effective length of its lever arm for the purpose of varying the extent of the swinging movement imparted to the follower gear 154. The means 244 comprises a generally U-shaped member 245 which is slidably received within the U-shaped member 239. As shown in FIG. 8, the U-shaped member 245 has a generally vertically disposed threaded opening 247, which is threadably engaged with a threaded shaft or rod 248 whose upper end is rotatably supported within a bushing 250 secured to the upper end of the U-shaped member 239. The lower end of the shaft 248 has fixed thereon a worm gear 253 which is in constant mesh with a worm 254. The worm gear 253 and the worm 254 are suitably housed within a box or compartment 255 mounted on the lower end of the U-shaped member 238. The worm 254 is connected to one end of a flexible shaft 256. The other end of the flexible shaft 256 is adapted to be operatively connected to a suitable electric motor or solenoid device (not shown), which when energized causes the shaft 256 and the worm 254 to be rotated.

The connecting means 238 comprises a connecting rod means 260 having one end pivotally connected between the spaced legs of the U-shaped member 245 by a pivot pin 261. The other end of the connecting rod means 260 is provided with a bifurcated member 262 which is pivotally connected to one end of an arm 263 by a pivot pin 264. The other end of the arm 263 is rigidly seecured to a bushing 265 which is rotatably journaled on a reduced end portion of the output shaft 158, which shaft projects intermediate the gears 152 and 156. Also secured to the bushing 265 is a short shaft 266 which projects radially thereof and in an opposite direction to the arm 263 and to which shaft the follower gear 154 is rotatably journaled by suitable bearings 267. The shaft 266 has a threaded portion at its radial outer end to which a nut 268 is threadably secured for retaining follower gear 154 on the stem 266.

From the foregoing, it can be seen that when the center of the pivot pin 261 is spaced from the center of the shaft 222 and the latter shaft rotated, the lever means 237 will be rocked or rotated about the axis of the shaft 222. The connecting means 238 transmits the rocking movement of the lever means 237 to the follower gear 154 thereby causing the follower gear 154 to be swung or rotated about the axis of the gears 152 and 156. Moreover, it will be seen that the effective length of the lever arm, which is the distance between the axis of the shaft 222 and the pivot pin 261, can be varied to vary the magnitude of the speed increase during each revolution of the knives 24 and 25. The length of the lever arm is varied by rotating the worm 254 which causes the worm gear 253 and the stem 248 to rotate. Rotation of the shaft 248 in one direction will cause the U-shaped member 245 to move upwardly, as viewed in FIG. 8, and away from the axis of the shaft 222 to increase the effective length of the lever arm and rotation of the shaft 248 in the opposite direction will cause the U-shaped member 245 to move toward the axis of the shaft 222 and decrease the effective length of the lever arm. When the U-shaped member 245 is positioned so that the axis of the pivot pin 261 coincides with the axis of the shaft 222 no motion is transmitted to the connecting means 238 by the lever means 237 and thus, the follower gear 154 will remain stationary and the drive connection between the input and output gears 152 and 156 of the differential drive arrangement 141 will be such that the output gear is continuously rotated at the same speed as the input gear. The connecting rod means 260 comprises a pair of rods 270, 271 having adjacent threaded end portions threadably received within a turnbuckle 272 for the purpose of varying the length of the connecting rod means 260 to accommodate changes in the length of the lever arm.

The knife positioning mechanisms E and F for oscillating the knife assemblies B and C toward and away from one another are identical in construction, except as noted below, and only the upper knife positioning mechanism E for oscillating the knife assembly B will be described in detail. The corresponding parts of mechanism F will be designated by the same reference characters but having a prime mark affixed thereto. The mechanism E comprises a shaft 280 extending transversely through the top 16 and having one end projecting within the hollow column 13 and the other end extending through both walls 281 and 282 of the hollow column 14. The shaft 280 is supported for rotation by siutable bearings mounted on the inside wall 87 of the column 13, both walls 281 and 282 of the column 14 and to a pair of downwardly extending support plates 284 and 285 secured to the top 16. The shaft 280 is operatively connected with both sides 71 and 72 of the carrier 20 by a pair of crank assemblies 287 and 288, respectively. Since both crank assemblies are identical in construction, only the right crank assembly 288, as viewed in FIG. 1, will be described in detail.

The crank assembly 288 comprises a bifurcated member 290 having one end fixed to the shaft 280 intermediate the wall 281 and the plate 285 and the other end pivotally connected to one end of a connecting rod 291 by a pivot pin 292. The other end of the connecting rod is disposed between the walls 75 and 76 of the side 72 of the carrier 20 and pivotally connected therewith by a pivot pin or bolt 293 fixed to the walls 75 and 76. The crank assemblies 287 and 288 provide a support for the left end of the carrier 20, as viewed in FIG. 2.

The knife positioning mechanism E further comprises a selectively operable power means 300 operatively connected with the shaft 280 by a lever 301 for oscillating the knife assembly B about its pivotal connection with the columns 13 and 14 toward and from the table 18. The power means 300 comprises a double acting reciprocating fluid motor 305 and a stop check unit 308 operatively connected therewith for varying the stroke of the fluid motor 305. The fluid motor 305 and check stop unit 308 may be of any conventional construction, such as the combination air motor and electrically controllable hydraulic stop check unit manufactured by The Bellows Company of Akron, Ohio, Model No. SB–DA–ST–BP–EM–15A (6″ stroke). Since the power means 300 does not per se form a part of the present invention, it will only be described to the extent necessary for carrying out the provisions of the present invention.

Referring to the schematic illustration of the power means 300 in FIG. 9, the fluid motor 305 has a piston 310 slidably received within a cylinder 311 and an axially extending piston rod 312 connected with the piston 310 and projecting beyond both ends 313 and 314 of the cylinder 311. One end of the piston rod 312 is pivotally connected to one end of the lever 301 by a pin 315. The other end of the lever 301 is fixed to the shaft 280 intermediate the walls 281 and 282 of the column 14. The cylinder 311 is pivotally mounted between the walls 281 and 282 of the column 14 in any suitable manner for movement about a horizontal axis.

The fluid motor 305 is adapted to be supplied with a fluid, such as compressed air, from any suitable source. A conventional solenoid operated reversing valve 317 is employed to control the flow of the fluid to and from the motor 305. The solenoid operated valve 317 is connected to the opposite ends 313 and 314 of the fluid motor 305 by combined delivery and return conduits 318 and 319 and operates as a reversing valve for the flow of fluid to and from the opposite ends of the motor 305. The valve includes actuating solenoids 320 and 321 which are selectively energized for producing the flow reversing functioning of the valve. Fluid under pressure is supplied to the valve 317 by a conduit 322 and the return of fluid from the motor 305 is exhausted to the atmosphere through the valve 317 and a conduit 323.

The stop check unit 308 is suitably secured to and supported by the fluid motor 305 and comprises a cylinder 324 having a piston 325 slidably received therein and connected to the other end of the piston rod 312. The piston 325 divides the cylinder 324 into a pair of chambers 326 and 327 each of which is filled with hydraulic fluid and which chambers are in communication with each other via conduit means 328. A conventional spring biased solenoid actuated valve 330 is employed to control the flow of hydraulic fluid through the conduit means 328. The valve 330 includes an actuating solenoid 331 which, when energized, moves the valve 330 against the bias imposed by a spring 332 to its open position to permit displacement of hydraulic fluid from one chamber to another. When the solenoid 331 is de-energized, the spring 332 moves the valve to its closed position which prevents any displacement of hydraulic fluid from one chamber to another.

When solenoid 331 is energized and when solenoids 320 and 321 are energized and de-energized, respectively, the chambers 326 and 327 of the cylinder 324 are in communication with each other and fluid is supplied to the left end 313 of the cylinder 311 by the conduit 318 and exhausted to the atmosphere from the right end 314 of the cylinder 311 by conduit 319 which causes the pistons 310 and 325 to be moved toward the right. Movement of the piston 310 toward the right causes the lever 301, the shaft 280 and the arm 290 to be rotated about the axis of the shaft 280 in the direction indicated by the arrow 333 in FIG. 2, which in turn causes the knife assembly B to be oscillated about its pivotable connection with the columns 13 and 14 in an upward direction relative to table 18. Movement of the piston 325 toward the right displaces hydraulic fluid from chamber 327 to chamber 326. The position to which the knife assembly B is oscillated or moved relative to the table 18 can be adjusted or varied by de-energizing the solenoid 331 at various times which results in the valve 330 being moved to its closed position by the spring 332 and thereby preventing further displacement of fluid from the chamber 327 to the chamber 326 and further movement of the pistons 325 and 310 toward the right.

When solenoid 331 is energized and when solenoids 321 and 320 are energized and de-energized, respectively, the chambers 326 and 327 of the cylinder 324 are in communication with each other, and fluid is supplied to the right end 314 of the cylinder 311 by the conduit 319 and exhausted to the atmosphere from the left end of the cylinder 311 via conduit 318 which causes the pistons 310 and 325 to move toward the left. Movement of the piston 310 toward the left causes the lever 301, the shaft 280 and the arm 290 to be rotated about the axis of the shaft 280 in the direction indicated by the arrow 334 in FIG. 2, which in turn causes the knife assembly B to be moved about its pivotal connection with the columns 13 and 14 in a downward direction relative to the table 18. Movement of the piston 325 toward the left displaces hydraulic fluid from chamber 326 to chamber 327. The position to which the knife assembly B is moved or oscillated relative to the table 18 can be adjusted or varied by de-energizing the solenoid 331 at the desired time thereby resulting in the valve 327 being moved to its closed position by the spring 329 and preventing further displacement of fluid from the chamber 326 to the chamber 327 and further movement of the pistons 323 and 310 toward the left.

The bottom carrier 25 of the knife positioning mechanism F is supported in an identical manner as the top carrier 24 except that the shaft 280' is located adjacent the base 12 and intermediate portions of the shaft 280' are supported by suitable bearings mounted on support plates 296 and 297 secured to the base 12.

The cut-off apparatus, in the preferred embodiment, includes an electrical control system for positioning the knife assemblies B and C in either the first cutting or severing position, hereinafter referred to merely as severing position, the second cutting or perforating position, hereinafter merely referred to merely as perforating position, or an open or non-cutting position, hereinafter merely referred to merely as open position. The control system can be either manually operated to position the knife assemblies B and C in either of the three positions or it can be manually pre-set to automatically position the knife assemblies B and C such that the knives 24 and 25 thereof perform a severing operation every sixth or less revolution thereof or to position the knife assemblies B and C such that they perform a severing operation during one revolution of the knives and a perforating operation during each, every second or any particular one of the remaining revolutions of the knives in accordance with a pre-selected operating sequence. The operating sequence, in the embodiment shown, can be spread over a maximum of six revolutions of the knives 24 and 25.

Figure 10:
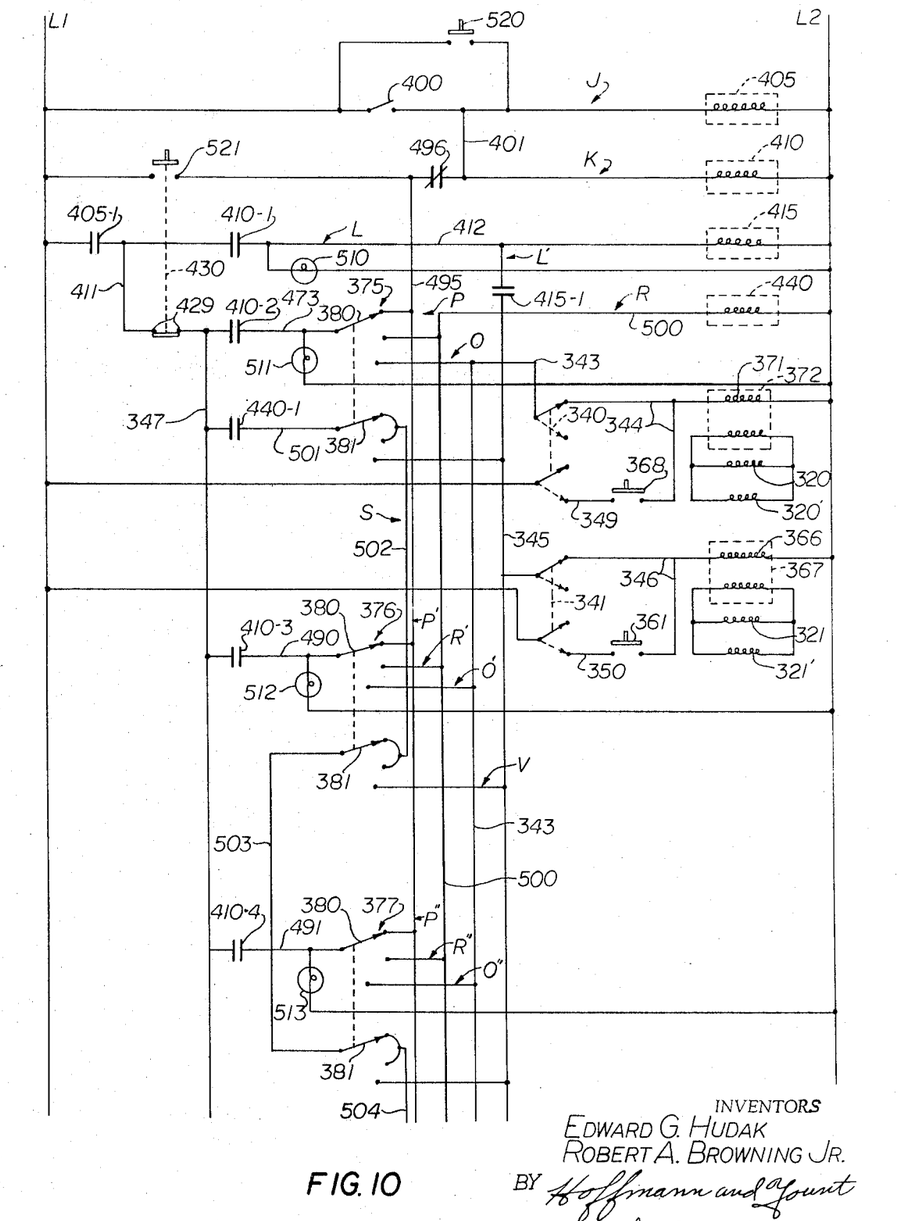
FIGS. 10 and 11 show a schematic wiring diagram illustrating the control system for part of the cut-off apparatus illustrated in FIG. 1.
Figure 11:
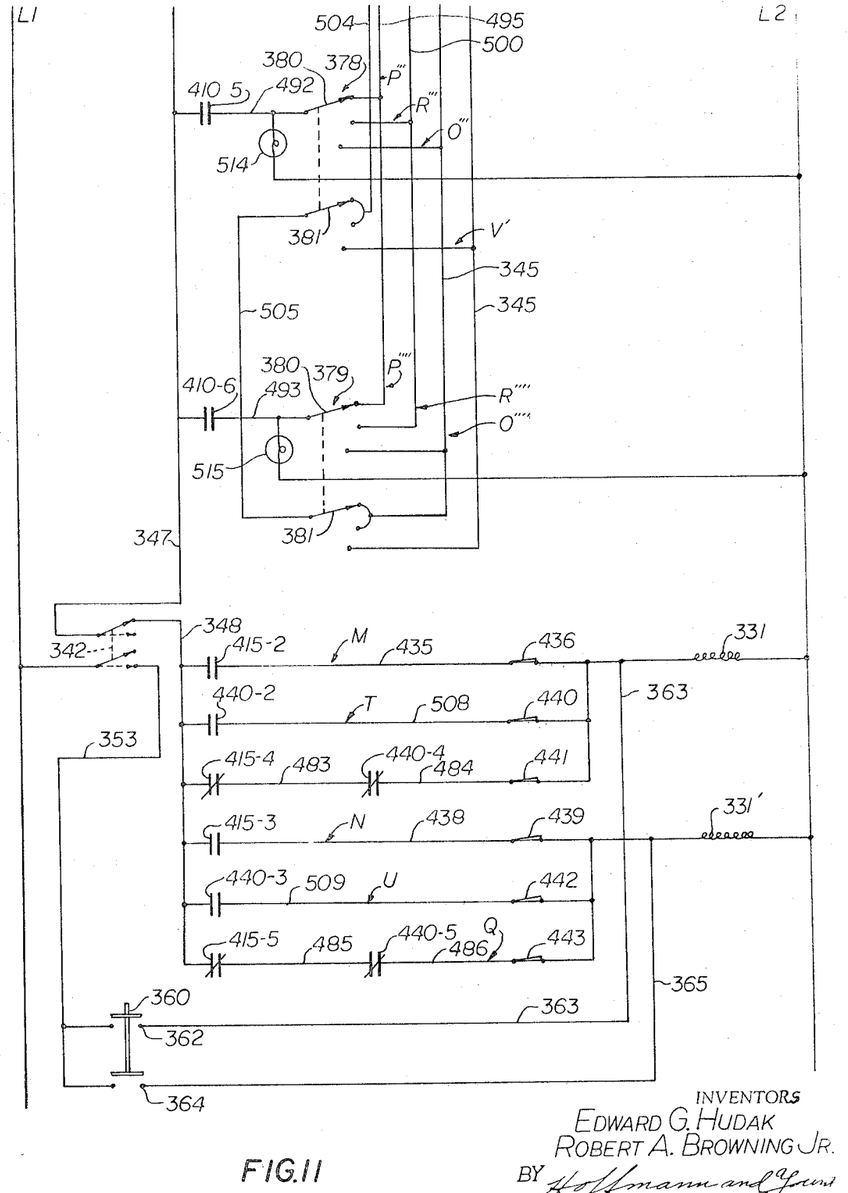

Referring to FIGS. 10 and 11, the control system is provided with manually operable selector switches 340, 341 and 342 to enable the control system to be switched from automatic operation to manual operation, or vice versa. The switches 340, 341 and 342 comprise spaced upper and lower contact arms and are manually movable between two positions, i.e., a first position, indicated by the solid lines in FIGS. 10 and 11, wherein the upper contact arms thereof connect wires 343 and 344, 345 and 346, and 347 and 348 of the control circuits for the solenoids 320 and 320', 321 and 321', 331 and 331' respectively, for automatic operation, and a second positon, indicated by the dotted lines in FIGS. 10 and 11, wherein the lower contact arms connect power conductor L1 with wires 349, 350 and 353 of the control circuits for the solenoids 320 and 320', 321 and 321' and 331 and 331', respectively, for manual operation.

Assume, for the purposes of illustration, that a length of board stock is being continuously advanced through the cutoff apparatus and that the knives 24 and 25 are being rotated at a speed such that they will make one revolution for each four feet of board length fed, and that the adjustable lever means 237 has been properly adjusted so that the knives 24 and 25 when in their severing or perforating positions effect a square or substantially square cut during each cutting operation. Assuming further that it is desired to manually operate the control system, the operator first sees to it that the switches 340, 341 and 342 are in their second position, as indicated by the dotted lines in FIGS. 10 and 11.

When it is desired to position the knife assemblies B and C in their severing position, the operator will depress normally open push button switches 360 and 361. When the push button switch 360 is depressed a circuit is completed from power conductor L1 through the lower contact arm of switch 342, wire 353, the upper contacts 362 of normally open, but now closed push button switch 360, wire 363 and the solenoid 331 of the stop check unit 308 of the power means 300 of the knife positioning mechanism E to L2. A circuit is also completed from power conductor L1 through the lower contact arm of switch 342, wire 353, the lower contacts 364 of normally open, but now closed, push button switch 360, wire 365 and the solenoid 331' of the stop check unit 308' of the power means 300' of the knife positioning mechanism F to L2. When push button switch 361 is depressed a circuit is completed from power conductor L1 through the lower contact arm of switch 341, wire 350, normally open, but now closed switch 361, wire 346, primary coil 366 of transformer 367 to power conductor L2. The solenoids 321 and 321' of the valve means 317 and 317' of the power means 300 and 300' of the knife positioning mechanisms E and F, respectively, are connected in parallel circuits with one another across the output or secondary coil of transformer 367, and are energized by completion of the circuit described.

The energization of the solenoids 331 and 331' and 321 and 321' cause the power means 300 and 300' of the knife positioning mechanisms E and F to move the knife assemblies B and C, respectively, toward the table 18. When the knife assemblies B and C have been moved to their severing position the operator will release push button switch 360 to break the circuits containing the solenoids 331 and 331'. The de-energization of the solenoids 331 and 331' prevents the power means 300 and 300' from causing any further movement of the knife assemblies B and C and thereby positions the same in their severing position. The operator will then release push button switch 361 to break the circuits for the solenoids 321 and 321'. The de-energization of the solenoids 321 and 321' performs no present function. When the knife assemblies B and C are in their severing position the knives 24 and 25 effect a severing of the board 19 as they pass through their bottom and top dead center positions, respectively.

Accurate positioning of the knife assemblies B and C in their severing position can be attained by employing fluid motors 305 and 305' which have an operating stroke such that the knife assemblies will be in their severing position at one end of the stroke. Alternately, the projecting portion of the piston rods 312 and 312' may be provided with a threaded portion to which a pair of nuts (not shown) are threadedly connected which engage the right ends of the cylinders 311 and 311', as viewed in FIG. 2, when the knife assemblies B and C have reached their severing position.

When it is desired to position the knife assemblies B and C in their open position the operator will depress normally open push button switches 360 and 368. When push button switch 360 is depressed the solenoids 331 and 331' are energized and for reasons described above. When the push button switch 368 is depressed a circuit is completed from power conductor L1 through the lower contact arm of switch 340, wire 349, normally open but now closed push button switch 368, wire 344, primary coil 371 of transformer 372 to L2. The solenoids 320 and 320' of the valve means 317 and 317' of the power means 300 and 300' of the knife positioning mechanisms E and F, respectively, are connected in parallel circuits with one another across the output or secondary coil of transformer 372, and are energized by the completion of the circuit described.

The energization of solenoids 331 and 331' and solenoids 320 and 320' cause the power means 300 and 300' of the knife positioning mechanisms E and F to move the knife assemblies B and C, respectively, away from the table 18. When the knife assemblies B and C have been moved to a position such that the knives 24 and 25 thereof will not contact the board when they subsequently pass through their bottom and top dead center positions, respectively, the operator will release the push button switch 360. Releasing the push button switch 360 breaks the circuits for the solenoids 331 and 331' and de-energizes the same to prevent the power means 300 and 300' from causing any further movement of the knife assemblies B and C and thereby positions the same in their open position. The operator will then release push button switch 368 to break the circuits for the solenoids 320 and 320'. The de-energization of the solenoids 320 and 320' performs no present function. When the knife assemblies B and C are in their open position the knives 24 and 25 do not contact the board 19 as they pass through the bottom and top dead center position, respectively.

When it is desired to position the knife assemblies B and C in their perforating position the operator will depress push button switch 360 and push button switch 361 if the knife assemblies had been in the open position during the previous revolution of the knives 24 and 25 or push button switch 368 if the knife assemblies had been in the severing position during the previous revolution of the knives 24 and 25. When the push button switches 360 and 361 are depressed, the solenoids 330 and 331' and 321 and 321' are energized and the power means 300 and 300' cause the knife assemblies B and C to be moved toward the table 18. When push button switches 360 and 368 are depressed, the solenoids 331 and 331' and 320 and 320' are energized and the power means 300 and 300' cause the knife assemblies B and C to be moved away from the table 18. When the knife assemblies B and C are in their perforating position the operator will release the push button switch 360 which causes the solenoids 331 and 331' to be de-energized to prevent the power means 300 and 300' from causing any further movement of the knife assemblies B and C, respectively, and thereby positions the same in their perforating position. After releasing push button switch 360, the operator will release the push button switch 361 or 368, depending upon which of the two was depressed, to break the circuits for the solenoids 321 and 321' and 320 and 320', respectively. The knives 24 and 25, when the knife assemblies are in the perforating position, effect a perforating operation on the board 19 as they pass through their bottom and top dead center positions, respectively.

From the foregoing, it is apparent that by actuating push button switch 360 and selectively actuating push button switches 361 and 368, the knife assemblies B and C can be positioned so that the knives 24 and 25 perform a severing operation once per each revolution or once per multiple revolution thereof whereby variable lengths of board may be cut. Moreover, it is apparent that the knife assemblies may be positioned such that the knives 24 and 25 perforate the board between successive severing operations whereby boards performed at spaced intervals therealong may be provided.

The manner in which automatic operation of the control system is achieved will be described next. When automatic operation of the control system is desired the operator looks to see if the manually operable switches 340, 341 and 342 are in their first position, as indicated by the solid lines in FIGS. 10 and 11, and if not in that position, he will move them to that position. The control system, in the preferred embodiment, functions to position the knife assemblies B and C in their severing position during the initial portion of one revolution of the knives 24 and 25 of any pre-selected operating sequence, and to position the knife assemblies B and C in either their open position or perforating position during the remaining revolution or revolutions of the knives 24 and 25 of the operating sequence. If an operating sequence spread over less than six revolutions of the knives 24 and 25 is desired, provision is made whereby the control system after the last revolution of the knives of the operating sequence can be automatically reset to again position the knife assemblies B and C in their severing position during the next revolution of the knives and the operating sequence repeated.

Referring to FIGS. 10 and 11, the control system includes a plurality of selector switches 375, 376, 377, 378 and 379, which are manually presettable by the operator, for selecting which position the knife assemblies B and C are to be positioned during the next or remaining revoltuions of the knives 24 and 25 of the operating sequence subsequent to the revolution of the knives 24 and 25 in which they are positioned in their severing position. Since all of the selector switches 375 through 379 are identical in construction and manually preset in the same manner, only the selector switch 375 will be described in detail.

The selector switch 375 comprises a suitable or conventional three-position switch by which the operator can preselect which of three circuits is to be energized. The switch, as schematically shown in FIG. 10, comprises a stator element having first and second spaced apart sets of contacts and a rotor element having upper and lower spaced apart contact arms 380 and 381 selectively engageable with the respective contacts of the first and second sets. The rotor is selectively movable between a first position in which contact arms 380 and 381 engage the upper contact of the first and second sets, as shown in FIGS. 10 and 11, a second position in which the contact arms 380 and 381 engage the intermediate contact of the first and second sets and a third position in which the contact arms 380 and 381 engage the lower contact of the first and second sets, respectively.

Assume, for the purposes of illustration, that it is desired to cut a continuously advancing length of board stock into twenty four foot lengths. To cut the board 19 into twenty four foot lengths with the knives rotating at a speed such that they make one revolution per each four feet of board length fed, it will be necessary to position the knife assemblies B and C in the severing position during one revolution of the knives 24 and 25, which in the preferred embodiment of the control system is the initial revolution of the knives 24 and 25 of the operating sequence, and in the open position during the remaining revolutions, i.e., the second through sixth revolutions, of the knives of the operating sequence. In order to achieve this operating sequence, the operator of the machine will move the selector means 375 through 379 to their third position, in which position the contact arms 380 and 381 are in contact with the lowermost contact of the first and second set of contacts.

For purposes of description, it will be assumed that the knives 24 and 25 have just completed their last revolution of the previous operating sequence and that the operating sequence is to be repeated. The knives 24 and 25 are rotated in synchronism and, in the embodiment shown, immediately after the blade 100 of the knife 24 has passed through its bottom dead center position during the last revolution of the previous operating sequence a normally open limit switch 400 mounted on the knife carrier 20 and closed by a trip operatively associated with a part of the knife 24 is momentarily closed. The momentary closing of limit switch 400 completes a circuit J from power conductor L1 through normally open, but now closed limit switch 400, wire 401, instant close, delayed opening time delay relay 405 to L2. The momentary closing of limit switch 400 also completes a circuit K from power conductor L1 through normally open but now closed limit switch 400, wire 401 and step coil 409 of a stepping or ratchet relay 410 to L2. Energization of instant close, delayed opening time delay relay 405 closes contacts 405–1. The stepping relay 410 comprises a suitable or conventional stepping switch having a rotor and a stator with six spaced apart sets of contacts 410–1 through 410–6 and repeated energization of the stepping coil 409 functions to move the rotor in one direction and sequentially close the contacts 410–1 to 410–6.

The closing of contacts 405–1 and 410–1 completes a circuit L from power conductor L1 through normally open but now closed contacts 405–1, wire 411, normally open but now closed contacts 410–1, wire 412 and severing position relay 415 to power conductor L2. Energization of relay 415 closes normally open contacts 415–1 through 415–3 and opens normally closed contacts 415–4 and 415–5. The closing of contacts 415–1 completes a circuit L' from power conductor L1 through normally open but now closed contacts 405–1, wire 411, normally open but now closed contacts 410–1, wire 412, normally open but now closed contacts 415–1, wire 345, upper contact arm of manual switch 341, wire 346, input coil 366 of transformer 367 to power conductor L2. The solenoids 321 and 321' of the valve means 317 and 317' of the power means 300 and 300' of the knife positioning mechanisms E and F, respectively, are connected in parallel circuits with one another across the output or secondary coil of the transformer 367, and are energized by the completion of the circuit L'.

The closing of contacts 415–2 complete a circuit M from power conductor L1 through normally open but now closed contacts 405–1, wire 411, normally closed contacts 429 of manual switch 430, wire 347, upper contact arm of manual switch 342, wire 348, normally open but now closed contacts 415–2, wire 435, normally closed severing position limit switch 436 for knife assembly B, wire 363, solenoid 331 of the stop check unit 308 of the power means 300 of the knife positioning mechanism E to L2. The closing of contacts 415–3 completes a circuit N from power conductor L1 through normally open but now closed contacts 405–1, wire 411, normally closed contacts 429 of manual switch 430, wire 347, upper contact arm of manual switch 342, wire 348, normally open but now closed contacts 415–3, wire 438, normally closed severing position limit switch 439 for knife assembly C, wire 365, solenoid 331' of the stop check unit 308 of the power means 300 of the knife positioning mechanism F to L2. The opening of contacts 415–4 and 415–5 performs no present function.

Energization of the solenoids 321 and 321' and 328 and 328' causes the power means 300 of the respective knife positioning mechanisms E and F to move the knife assemblies B and C toward their severing position. When the knife assemblies B and C are in their severing position, limit switches 436 and 439 are actuated to their open positions and break the circuits M and N to de-energize the solenoids 331 and 331'. The de-energization of the solenoids 331 and 331' prevents the power means 300 and 300' from causing any further movement of the knife assemblies B and C and thereby positions the same in their severing position. The time delay relay 405, in the preferred embodiment, is timed such that it will open contacts 405–1 and cause the circuits L and L' previously energized to be de-energized prior to the knives 24 and 25 completing their revolution and prior to the performance of a severing operation on the board 19.

The normally closed limit switches 436 and 439 are located within housings 450 and 451 mounted on the column 13, which housings also contain normally closed limit switches 440 and 441 and 442 and 443 which are adapted to be actuated to their open position when the knife assemblies B and C are in their perforating and open positions, respectively. The limit switches 436, 440, 441 and 439, 442, 443 are actuated to their open positions by mechanisms 452 and 453 operatively associated therewith and drivingly connected with the shafts 280 and 280' of the respective knife positioning mechanisms E and F, respectively. Since both mechanisms 452 and 453 are of an identical construction, only the mechanism 453 for actuating the limit switches 439, 442 and 443 will be described in detail.

The mechanism 453 comprises a spur gear 454 fixed to the shaft 280' at its end located between the walls 86 and 87 on the column 13 and which is in constant mesh with a spur gear 455 fixed to a shaft 456 supported for rotation at one end by suitable bearings mounted on the wall 87 of the column 13. Fixed to the other end of the shaft 456, which end projects within the housing 451, is one leg of an L-shaped rod or member 457, the other leg of which carries three spaced apart members 458 extending radially inwardly toward the axis of the shaft 456.

The limit switches 439, 442 and 443 are mounted on flat peripheral portions of worm gears 459, 460 and 461, respectively, rotatably journalled at laterally spaced locations on a shaft 462 fixed within the housing 451. Each of the worm gears 459, 460 and 461 is in constant mesh with a worm 463 fixed on a shaft 464 supported for rotation within the housing 451 and having one end thereof projecting through an aperture in the housing 453 and to which a control knob 465 is fixed for the purpose of varying the angular relationship between the members 458 and the limit switches 439, 442, and 443. The limit switches 439, 442 and 443 may be of any suitable or conventional construction, and since they do not per se form a part of the present invention they will not be described in detail.

When the power means 300' of the knife positioning mechanism F causes the shaft 280' to be rotated, the shaft 456 and the L-shaped rod member 457 are also caused to be rotated. The limit switches 439, 442 and 443 are actuated to their open positions when engaged by the members 458 carried by the rotating rod 457. It is also apparent that the position to which the knife assemblies are moved relative to the table 18 can be varied or adjusted by manually turning the respective control knobs 465 to vary the angular relationship between the switches 439, 442 and 443 and the members 458 carried by the rod 457.

The knives 24 and 25 effect a severing of the board 19 as they pass through their bottom and top dead center positions, respectively, and again momentarily actuate the limit switch 400 to its closed position immediately thereafter. The closing of limit switch 400 completes the circuits J and K to momentarily energize the instant close, delayed opening time delay relay 405 and the step coil 409 of stepping relay 410 which in turn closes contacts 405–1 and causes the relay 410 to move the stepping switch to its next position and close contacts 410–2. The closing of contacts 410–2 completes a circuit O from power conductor L1 through normally open but now closed contacts 405–1, wire 411, normally closed contacts 429 of manual switch 430, wire 347, normally open but now closed contacts 410–2, wire 473, upper contact arm of selector switch 375, wire 343, upper contact arm of manual switch 340, wire 344 and primary coil 371 of transformer 372 to L2. The solenoids 320 and 320' are connected in parallel with one another across the output or secondary coil of the transformer 372 and are energized when the circuit O through the primary coil 371 is completed.

The closing of contacts 405–1 also completes circuits P and Q for energizing the solenoids 331 and 331' of the knife positioning mechanisms E and F, respectively. The circuit P for solenoid 331 of the knife positioning mechanism E is from wire 348 through normally closed contacts 415–4, wire 483, normally closed contacts 440–4 of relay 440, wire 484 and open position limit switch 441 for knife positioning mechanism E to wire 363. The circuit Q for solenoid 331' of knife positioning mechanism F is from wire 348 through normally closed contacts 415–5, wire 485, normally closed contacts 440–5 of relay 440, wire 486 of open position limit switch 443 for knife positioning mechanism F to wire 365.

Energization of the solenoids 320 and 320' and the solenoids 331 and 331' causes the power means 300 and 300' of the respective knife positioning mechanisms E and F to move the knife assemblies B and C toward their open position. When the knife assemblies B and C are in their open positions, limit switches 441 anl 443 are actuated to their open position and break the circutis P and Q for the solenoids 331 and 331', respectively. De-energization of the solenoids 331 and 331' prevents the power means 300 and 300' from causing any further movement of the knife assemblies B and C, respectively, and thereby positions the same in their open position. The instant close, delayed opening time delay relay 405 again functions to open the contacts 405–1 and causes the circuits mentioned to be de-energized prior to the time the knives 24 and 25 complete their revolution.

With the knife assemblies B and C in their open position the knives 24 and 25 as they pass through their bottom and top dead center positions, respectively, do not contact the board 19 and shortly thereafter the knife 24 again momentarily actuates the limit switch 400 to its closed position. The control system for the third through sixth revolution of the knives 24 and 25 of the operating sequence functions in the same manner as heretofore described with respect to the second revolution of the knives except that circuits O', O", O''', and O'''' for the solenoids 320 and 320' will be sequentially energized during the third through sixth revolutions of the knives 24 and 25, respectively. The circuit O' through O'''' are parallel circuits between wires 347 and 343 around contacts 410–2 and selector switch 375. The circuit O' is from wire 347 through normally open contacts 410–3, which contacts are closed by the relay 410 during the third revolution of the knives 24 and 25, wire 490 and the upper contact arm of selector switch 376 to wire 343. The circuit O" is from wire 347, through normally open contacts 410–4, which contacts are closed by the relay 410 during the fourth revolution of the knives 24 and 25, wire 491 and the upper contact arm of selector switch 377 to wire 343. The circuit O''' is from wire 347, through normally open contacts 410–5, which contacts are closed by the relay 410 during the fifth revolution of the knives 24 and 25, wire 492 and upper contact arm of selector switch 378 to wire 343. The circuit O'''' is from wire 347, through normally open contacts 410–6, which contacts are closed by relay 410 during the sixth revolution of the knives 24 and 25, wire 493 and the upper contact arm of selector switch 379 to wire 343. After the knife 24 has passed through its bottom dead center position during the sixth revolution thereof and again actuates limit switch 400 to its closed position to cause the stepping relay 410 to move the stepping switch to close contacts 410–1, the entire operating sequence will be repeated.

If it were desired to cut the continuously advancing board into lengths of four feet, it will be necessary to position the knife assemblies B and C in their severing position during each revolution of the knives 24 and 25. In order to achieve a severing operation during each revolution of the knives 24 and 25, the operator of the machine will move the selector switches 375 through 379 to their first position, in which position the contact arms 380 and 381 are in contact with the uppermost contact of each set of contacts, as shown in FIGS. 10 and 11. Again, for purposes of description, it will be assumed that the knives have just completed their last revolution of the previous operating sequence and that the operating sequence is to be repeated. The knife 24 as it passes through its bottom dead center position during the last revolution of the previous operating sequence will momentarily actuate limit swicth 400 to its closed position. The momentary closing of limit switch 400 will complete the circuits J and K and energize relays 405 and the step coil 409 of the stepping relay 410. Energization of stepping relay 410 causes the stepping switch to be moved and close contacts 410–1. Energization of relay 405 closes contacts 405–1. The closing of contacts 405–1 and 410–1 completes the circuit L and energizes severing position relay 415. Energization of relay 415 closes contacts 415–1 through 415–3 and opens contacts 415–4 and 415–5. The closing of contacts 415–1 completes the circuit L' which causes solenoids 321 and 321' to be energized. The closing of contacts 415–2 and 415–3 complete the circuits M and N for the solenoids 331 and 331' of the knife positioning mechanisms E and F, respectively.

Energization of the solenoids 321 and 321' and 331 and 331' causes the power means 300 and 300' of the knife positioning mechanisms E and F to move the knife assemblies B and C, respectively, toward their severing position. When the knife assemblies B and C are in their severing position, limit switches 436 and 439 are actuated to their open positions and break the circuits M and N to de-energize the solenoids 331 and 331'. The de-energization of solenoids 331 and 331' prevents the power means 300 and 300' of the respective knife assembly positioning mechanisms E and F from causing any further movement of the knife assemblies B and C and thereby positions the same in their severing position. The time delay relay 405 is timed such that it will open contacts 405–1 and cause the circuits L and L' previously energized to be de-energized prior to the knives 24 and 25 completing their revolution and prior to the performance of a severing operation on the board 19.

The knives 24 and 25 effect a severing of the board as they pass their bottom and stop dead center positions, respectively, and again momentairly actuate the limit switch 400 to its closed position immediately thereafter. The closing of limit switch 400 completes the circuits J and K to momentarily energize the instant close, delayed opening time delay relay 405 and the step coil 409 of the stepping relay 410 which in turn closes contacts 405–1 and causes the relay 410 to move the stepping switch to its next position and close contacts 410–2. The closing of contacts 410–2 completes a circuit P from power conductor L1 through normally open but now closed contacts 405–1, wire 411, contacts 429 of normally closed push button switch 430, wire 347, normally open but now closed contacts 410–2, wire 473, upper contact arm 380 of selector means 375, wire 495, normally closed contacts 496 of stepping relay 410, wire 401 and the step coil 409 of the stepping relay 410 to L2. The completion of circuit P re-energizes the step coil 409 of the stepping relay 410 to cause the stepping switch to be moved to its next position and close contacts 410–3. When the stepping switch is moved from contacts 410–2 to 410–3, the contacts 410–2 are opened and the circuit P is de-energized.

The closing of contacts 410–3 completes a circuit P' which functions to re-energize the step coil 409 of the stepping relay 410 to cause the stepping switch to be moved to its next position and close contacts 410–4. When the stepping switch is moved from contacts 410–3 to 410–4, the contacts 410–3 are opened and the circuit P' de-energized. The closing of contacts 410–4 completes a circuit P" which functions to re-energize the step coil 409 of the stepping relay 410 to cause the stepping switch to be moved to its next position and close contacts 410–5. When the stepping switch is moved from contacts 410–4 to contacts 410–5, the contacts 410–4 are opened and the circuit P" de-energized. The closing of contacts 410–5 completes a circuit P''' which functions to re-energize the step coil 409 of the stepping relay 410 to cause the stepping switch to be moved to its next position and close contacts 410–6. When the stepping switch is moved from contacts 410–5 to 410–6, the contacts 410–5 are opened and the circuit P''' de-energized. The closing of contacts 410–6 completes a circuit P'''' which functions to re-energize the step coil 409 of the stepping relay 410 to cause the stepping switch to move to its next position and close contacts 410–1. When the stepping switch is moved from contacts 410–6 to 410–1, the contacts 410–6 are opened and the circuit P'''' is de-energized. The circuits P' through P'''' are parallel circuits between wires 347 and 343 and around contacts 410–2 and selector switch 375 and include normally open contacts 410–3, wire 490 and upper contact arm of selector means 376; normally open contacts 410–4, wire 491, and the upper contact arm of selector means 377; contacts 410–5, wire 492, and the upper contact arm of selector means 378; and normally open contacts 410–6, wire 493 and the upper contact arm of selector means 379, respectively.

When the stepping switch is again moved to its first position in which it closes contacts 410–1, the entire operating sequence will be repeated. The circuits P through P'''' are all sequentially energized in a rapid manner such that the knife assemblies B and C are positioned in their severing position prior to the time that the knives 24 and 25 complete their next or second revolution and prior to the time that the knives 24 and 25 pass through their bottom and top dead center positions, respectively.

From the foregoing description of the operation of the control system it is apparent that by selectively setting the selector means 375–379 intermediate length boards, that is, board lengths of 8, 12, 16 and 20-foot lengths, can be cut. For example, if it were desired to cut the boards into 16-foot lengths, the operator of the machine would move the selector switches 375 and 376 and 377 to their third position so that the knife assemblies would be positioned in their open position during the second, third and fourth revolutions of the knives, and would move the selector switches 378 and 379 to their first position to cause the stepping relay to step through its last two contacts 410–5 and 410–6 and re-position the knife assemblies B and C in their severing position during their next revolution.

If it were desired, for example, to cut boards into twenty four foot lengths and perforated at four foot intervals therealong, it will be necesary to position the knife assemblies B and C in their severing position during one revolution of the knives and to position the knife assemblies B and C in their perforating position during the remaining revolutions of the knives. To achieve this operating sequence the operator will move the selector switches 375 through 379 to their intermediate position in which the upper and lower contact arms 380 and 381 engage the intermediate contact of the first and second sets of contacts. Again, for purposes of description, it will be assumed that the knives 24 and 25 have just completed their last revolution of the previous operating sequence and that the operating sequence is about to be repeated. As the knife 24 passes through its bottom dead center position during the last revolution of the previous operating sequence, it will momentarily actuate limit switch 400 to its closed position.

The control system during the first revolution of the knives 24 and 25 functions to position the knife assemblies B and C in their severing position, and in a manner hereinbefore described.

The knives 24 and 25 effect severing of the board as they pass through their bottom and top dead center positions, respectively, during the first revolution of the knives and again momentarily actuate the limit switch 400 to its closed position immediately thereafter. The closing of limit switch 400 completes the circuits J and K to momentarily energize the instant closed, delayed opening time relay opening 405 and the step coil 409 of the stepping relay 410 which in turn closed contacts 405–1 and causes the relay 410 to move the stepping switch to its next position in closed contact 410–2. The closing of contact 410–2 completes a circuit R from power conductor L1 through normally open, but now closed contacts 405–1, wire 411, contacts 429 of switch 430, wire 347, normally open but now closed contacts 410–2, wire 473, the upper contact arm of selector switch 375, wire 500 and perforating position relay 440 to L2. Energization of the perforating position relay 440 closes contacts 440–1 through 440–3 and opens contacts 440–4 and 440–5.

The closing of contacts 440–1 completes a circuit S from power conductor L1 through normally open but now closed contacts 405–1, wire 411, normally closed contacts 429 of switch 430, wire 347, normally open but now closed contacts 440–1, wire 501, the lower contact arm 381 of selector switch 375, wire 502, the lower contact arm 381 of selector switch 376, wire 503, the lower contact arm 381 of selector switch 377, wire 504, the lower contact arm 381 of selector switch 378, wire 505, the lower contact arm 381 of selector switch 379, wire 343, the upper contact arm of manual switch 340, wire 344 and the primary coil 371 of transformer 372 to L2.

The completion of the circuit S energizes the solenoids 320 and 320' of the power means 300 and 300' of the respective knife positioning mechanisms E and F. The closing of contacts 440–2 and 440–3 completes circuits T and U which function to energize solenoids 331 and 331' of the power means 300 and 300' of the knife positioning mechanisms E and F, respectively. The circuit T is a parallel circuit between wires 348 and 363 and around contacts 415–1 and limit switch 436 and includes normally open but now closed contact 440–2, wire 508 and normally closed limit switch 440. The circuit U is a parallel circuit between wires 348 and 365 around contact 415–3 and limit switch 439 and includes normally open but now closed contacts 440–3, wire 509 and limit switch 442.

Energization of the solenoids 320 and 320' and 331 and 331' causes the power means 300 and 300', respectively, to move the knife assemblies B and C toward their perforating position. When the knife assemblies B and C are in their perforating position, limit switches 440 and 442 are actuated to their open positions to break the circuits T and U and de-energize the solenoids 331 and 331'. The de-energization of the solenoids 331 and 331' prevents the power means 300 and 300' from causing any further movement of the knife assemblies B and C, respectively, and thereby positions the same in their perforating position. The time delay relay 405 is timed such that it will open contacts 405–1 and causes the circuits R and S, previously energized, to be de-energized prior to the knives 24 and 25 completing their revolution and prior to the performance of the perforating operation on the board 19.

The knives 24 and 25 effect a perforating operation on the board 19 as they pass through their bottom and top dead center positions, respectively, and again momentarily actuate limit switch 400 to its closed position immediately thereafter. The control system for the third through sixth revolutions of the knives 24 and 25 of the operating sequence function in the same manner as heretofore described with respect to the second revolution of the knives except that circuits R', R'', R''' and R'''' for the perforating position relay 440 will be sequentially energized during the third through sixth revolutions of knives 24 and 25, respectively. The circuits R' through R'''' are parallel circuits between wires 347 and 500 around contacts 410–2 and selector switch 375. The circuit R' is from wire 347 through normally open contacts 410–3, which contacts are closed by the stepping relay 410 during the third revolution of the knives 24 and 25, wire 490 and the upper contact arm 380 of selector switch 376 to wire 500. The circuit R'' is from wire 347 through normally open contacts 410–4, which contacts are closed by the stepping relay 410 during the fourth revolution of the knives, wire 491 and the upper contact arm of selector switch 377 to wire 500. The circuit R''' is from wire 347 through normally open contacts 410–5, which contacts are closed by the stepping relay 410 during the fifth revolution of the knives, wire 492 and the upper contact arm of selector switch 378 to wire 500. The circuit R'''' is from wire 347 through normally open contacts 410–6, which contacts are closed by the stepping relay 410 during the sixth revolution of the knives, wire 493 and the upper contact arm of selector switch 379 to wire 500.

If it were desired, for example, to cut boards into twenty-four-foot lengths perforated at eight-foot intervals therealong, it will be necessary to position the knife assemblies B and C in their severing position during the first revolution of the knives, the open position during the second, fourth and sixth revolution of the knives and the perforating position during the third and fifth revolution of the knives. To achieve this operating sequence the operator will move the selector switches 375, 377 and 379 to their third position in which the upper and lower contact arms 380 and 381 contact the lower contact of the first and second sets of contacts and to move the selector switches 376 and 378 to their second position in which the upper and lower contact arms thereof engage the intermediate contact of the first and second sets of contacts. Again, for purposes of description, it will be assumed that the knives have just completed their last revolution of the previous operating sequence and that the operating sequence is to be repeated. The knife 24 as it passes through the bottom dead center position during the last revolution of the previous sequence will actuate limit switch 400 to its closed position. The control system during the first two revolutions of the knives will function to position the knife assemblies in their severing and open positions, respectively, and in the manner heretofore described.

As the knife 24 passes through its bottom dead center position after the second revolution of the knives it again actuates limit switch 400 to its closed position which in turn functions to energize circuits J and K to energize time delay relay 405 and stepping relay 410, respectively. Energization of time delay relay 405 and stepping relay 410 functions to close contacts 405–1 and to move stepping switch to its third position where contacts 410–3 are closed. The closing of contact 410–3 completes the circuit R' which functions to energize the relay 440. Energization of the severing positon relay 440 closes contacts 440–1 through 440–3 and opens contacts 440–4 and 440–5. The closing of contacts 440–1 completes a circuit V from power conductor L1 through normally open but now closed contacts 405–1, wire 411, normally closed contact 429 of switch 430, wire 347, normally open but now closed contacts 440–1, wire 501, the lower contact arm 381 of selector switch 375, which selector switch is in its third position wherein the upper and lower contact arms are engaged with the lower contact of the first and second sets of contacts, wire 345, the upper contact arm of manual switch 341, wire 346, and the primary coil 366 of the transformer 367 to L2. The completion of this circuit energizes solenoids 321 and 321'. The closing of contacts 440–2 and 440–3 completes the circuits T and U for the solenoids 331 and 331'. The opening of contacts 440–4 and 440–5 perform no present function.

Energization of the solenoids 321 and 321' and 331 and 331' causes the power means 300 and 300' to move the knife assemblies B and C, respectively, toward their perforating position and toward the table. When the knife assemblies B and C are in their perforating positions, limit switches 440 and 442 are actuated to their open position to break the circuits T and U to de-energize the solenoids 331 and 331'. The de-energization of the solenoids 331 and 331' prevent the power means 300 and 300' from causing any further movement of the knife assemblies B and C, respectively, and thereby positions the same in their perforating position. The time delay relay 405 is timed such that it will open contacts 405–1 and cause the circuit R' and V previously energized to be de-energized prior to the knives 24 and 25 completing their revolution and prior to the performance of a perforating operation on the board 19.

The knives 24 and 25 effect a perforating operation on the board as they pass through their bottom and top dead center positions, respectively, and again momentarily actuate the limit switch 400 to its closed position immediately thereafter. The control system will thereafter function to position the knife assemblies B and C in their open position during the fourth and sixth revolutions of the knives and in the manner hereinbefore described and to position the knife assemblies B and C in their perforating position during the fifth revolution of the knives and in the same manner as heretofore explained with respect to the third revolution of the knives except that a circuit V' will be energized. The circuit V' is a parallel circuit between wires 347 and 345 and around contacts 410–3 and selector means 376. The circuit V' is from wire 347 through normally open contacts 410–5, which contacts are closed by the stepping relay 410 during the fifth revolution of the knives, wire 492 and the upper contact arm of selector switch 378 to wire 345. After the knife 24 has passed through its bottom dead center position during the sixth revolution thereof and again actuates limit switch 400 to its closed position to cause the stepping relay 410 to move the stepping switch to close contacts 410–1, the entire operating sequence will be repeated.

The control system includes a plurality of indicator lights 510 through 515 which provide a visual indication to the operator when the contacts 410–1 through 410–6 of the stepping relay 410 are closed. The indicator lights 510 through 515 are located in parallel circuits between wires 412, 473 and 490 through 493 and power conductor L2, respectively, and are energized when the stepping relay has closed the respective contacts 410–1 through 410–6. The control system also includes provision for a manual index to enable the operator to manually index the stepping relay and position the stepping switch in any of its six positions prior to commencing operation of the cutting apparatus. To this end a normally open manually operable push button switch 520 located in a parallel circuit between power conductor L1 and wire 401 and around limit switch 400 is provided. By momentarily depressing the push button switch 520 the relay 410 is momentarily energized and functions to move the stepping switch to its next set of contacts, the indicator light for that set of contacts indicating to the operator the position of the stepping switch. The push button switch 520 can be repeatedly depressed until the desired contacts are closed prior to commencing operation of the cutting apparatus.

Provision is made to enable one or more sample cutting operations to be performed on the board without the necessity of sequentially energizing the various control circuits containing the selector switch 375–379 when initially setting up the machine. The manual switch 342 is moved to its second position, as indicated by the dotted lines in FIG. 11, if it was not already in the second position, whereby energization of the solenoids 331 and 331′ can be controlled manually. To initiate a sample cutting operation the manual push button switches 360 and 430 are depressed. The depression of push button switch 360 functions to energize the solenoids 331 and 331′ and in a manner hereinbefore described. The switch 430 is a two position switch having spaced upper and lower contacts 521 and 429, respectively. When the switch 430 is in the position shown in FIG. 10, the upper and lower contacts 521 and 429 are open and closed, respectively. When the switch 430 is depressed the upper contacts 521 are closed and the lower contacts 429 are opened which breaks the connection between wires 411 and 347 and thereby prevents the various control circuits containing the selector switches 375–379 from being energized.

The closing of the upper contacts 521 of switch 430 completes a circuit from power conductor L1 through normally open but now closed contacts 521 of switch 430, wire 495, normally closed contacts 496 of relay 410, wire 401, instant open, delayed closing time delay relay 405 to L2. A circuit is also completed from power conductor L1 through normally open but now closed contacts 521 of switch 430, wire 495, normally closed contacts 496 of relay 410, wire 401 and stepping relay 410 to L2. Energization of relays 405 and 410 closes contacts 405–1 and causes the stepping switch 410 to step through its contacts until it closes contacts 410–1 and simultaneously opens normally closed contacts 496. The closing of contacts 405–1 and 410–1 completes the circuits L and L′ which function to energize the solenoids 321 and 321′ of the power means 300 and 300′, respectively. Energization of the solenoids 321 and 321′ and 331 and 331′ causes the power means 300 and 300′ to move the knife assemblies B and C, respectively, toward their severing position, if they were not already in their severing position. When the knife assemblies B and C are in their severing position, the operator will release push button switch 360 to de-energize the solenoids 331 and 331′ and thereby prevent the power means 300 and 300′ from causing any further movement of the knife assemblies B and C.

The knives 24 and 25 as they pass through their bottom and top dead center positions, respectively, effect a cutting operation on the board and actuate the limit switch 400 to its closed position immediately thereafter. If the adjustable lever means 237, for example, was not properly adjusted to effect the proper speed increase for the knives 24 and 25 during the cutting operation, the knives will "plow" or "scuff" the board. If a "plowing" or "scuffing" of the board occurred, the adjustable lever means 237 can be adjusted so as to either increase or decrease the speed of the knives during the cutting operation if the peripheral speed of the knives was less than or more than the speed of the board, respectively.

The closing of limit switch 400 functions to momentarily re-energize relays 405 and 410 which in turn closes contacts 405–1 and causes the stepping switch to move to its next position and close contacts 410–2, respectively, the contacts 496 closing as the stepping switch is moved from contacts 410–1 to 410–2. The closing of contacts 496 re-energizes relay 410 and causes the stepping switch to step through its remaining contacts 410–3 to 410–6 and again closes contacts 410–1 and open contacts 496 which in turn causes the cutting operation to be repeated. The cutting operation can be repeated until the adjustable lever means 237 is properly adjusted or set so that the peripheral speed of the knives during the cutting operation will be the same as the feed speed of the board. When the proper adjustment for the adjustable lever means 237 is made, the manual switch 430 is released to close its lower contacts 429 and open its upper contacts and the manual switch 342 moved to its solid line position, as shown in FIG. 11, and automatic operation of the machine can then be commenced.

Although the control system, in the preferred embodiment, can have an operating sequence spread over a maximum of six revolutions of the knives 24 and 25, it will of course be understood that a greater or lesser number of sequences spread over a greater or lesser number of revolutions of the knives could be employed, if desired.

Although the cutting apparatus, in the preferred embodiment, has a cycle of operation for each revolution of the knives, it will, of course, be understood that the cutting apparatus could have a cycle of operation comprising multiple revolutions of the knives 24 and 25, if desired. It is to be further understood that the term cycle of operation, as used in the specification and claims, is a generic term and includes cycles of operation which occur for each fraction of, one, or more than one revolutions of the knives.

Although the cutting apparatus of this invention has been illustrated and described herein to a somewhat detailed extent, it will be understood of course, that the invention is not to be regarded as being limited correspondingly in scope but includes all changes and modifications coming within the terms of the claims hereof.

Having described our invention, we claim:

1. An apparatus for cutting a moving length of material at spaced intervals along its length, a frame assembly including support means for supporting the material to be cut as it is moved through the apparatus, a pair of knife assemblies having co-operating rotary knives, one of said assemblies being supported adjacent to one side of the support means and the other of said assemblies being supported adjacent to the other side of said support means, drive means operatively connected with said rotary knives for continuously rotating the same in opposite directions, said drive means including a mechanism whereby the rotational speed of said rotary knives may be automatically varied during different portions of each cycle of operation, adjusting means for said mechanism for changing the variation of the rotational speed of said rotary knife means during the cycle whereby the peripheral speed of the knife means during the cutting operation can be made the same as the speed of the material being cut, positioning means operatively connected with said knife assemblies for selectively moving the same between a cutting position in which said rotary knives cut the moving material and a second position in which said knives make no contact with the material; and control means for automatically and sequentially actuating said positioning means to move said knife assemblies between said positions in accordance with a predetermined operating sequence.

2. An apparatus for cutting a moving length of material at relatively long spaced intervals along its length, a frame assembly including support means for supporting the material to be cut as it is moved through the apparatus, a pair of co-operating rotary knives operatively connected to carrier members pivotally connected to said frame assembly for movement to and from said support means, one of said carrier members being supported adjacent to one side of said support means and the other adjacent to the other side of the support means for transversely cutting the material, drive means operatively connected with said rotary knives for continuously rotating the same in opposite directions, said rotary knives having an average peripheral speed during each cycle of operation which is less than the speed of the moving material, said drive means including a mechanism whereby the rotational speed of said rotary knives may be automatically varied during different portions of each cycle of operation, adjusting means for said mechanism for changing the variation in the rotational speed of said rotary knives during each cycle of operation whereby the peripheral speed of the knives during a cutting operation can be increased to be made the same as the speed of the material being cut, positioning means operatively connected with said carrier members for selectively moving the same between a cutting position in which said rotary knives cut the moving material and a second position in which said knives make no contact with the material; and control means for automatically and sequentially actuating said positioning means to move said carrier members between said positions in accordance with a predetermined operating sequence.

3. An apparatus for cutting a length of material fed thereto at a constant rate of speed, a frame assembly including support means for supporting the material to be cut as it is moved through the apparatus, a pair of co-operating rotary knives operatively connected to carrier members pivotally connected to said frame assembly for movement to and from said support means, one of said carrier members being supported adjacent to one side of said support means and the other adjacent to the other side of said support means, for transversely cutting the material, drive means operatively connected with said rotary knives for continuously rotating the same in opposite directions at a rotational speed whereby the knives make one revolution per each predetermined increment of board being fed and have an average peripheral speed during each revolution which is less than the speed of the material to be cut, said drive means including a mechanism whereby the rotational speed of said rotary knives may be automatically varied during different portions of each revolution, adjusting means for said mechanism for changing the variation in the rotational speed of the rotary knives during each revolution whereby the peripheral speed of the knives during a cutting operation can be increased to be made the same as the speed of the material being cut, positioning means operatively connected with said carrier members for selectively moving the same between a cutting position in which said rotary knives cut the moving material and a second position in which said knives make no contact with the material; and control means for automatically and sequentially actuating said positioning means to move said carrier members between said positions in accordance with a predetermined operating sequence.

4. An apparatus for cutting a length of material fed thereto at a constant rate of speed, a frame assembly including a support means for supporting the material to be cut as it is moved through the apparatus, a pair of knife assemblies having co-operating rotary knives, one of said assemblies being supported adjacent to one side of said support means and the other of said assemblies being supported adjacent to the other side of said support means, drive means operatively connected to said rotary knives for continuously rotating the same in opposite directions and at a rotational speed whereby the knives make one revolution per each predetermined increment of board length fed, said drive means including a differential drive arrangement having an input gear, an output gear and a follower gear in constant mesh with both the input and output gears, a mechanism operatively connected with said input gear and said follower gear for automatically causing the follower gear to be rotated about said input and output gears in opposite directions during different portions of each revolution, adjusting means for said mechanism for changing the extent of the rotational movement of said follower gear and thereby the variation in the rotational speed of the rotary knives during each revolution whereby the peripheral speed of the rotary knives during a cutting operation can be increased to be made the same as the speed of the material to be cut, positioning means operatively connected with said knife assemblies for selectively moving the same between a cutting position in which said rotary knives cut the moving material and a second position in which said knives make no contact with the material; and control means for automatically and sequentially actuating said positioning means to move said knife assemblies between said positions in accordance with a predetermined operating sequence.

5. An apparatus for cutting a moving length of sheet material at spaced intervals along its length; a frame assembly including means for supporting the material to be cut as it is moved through the apparatus; a knife assembly supported adjacent one side of said support means and comprising a knife carrier pivotally connected with said frame assembly for movement toward and from said support means and a rotary knife means rotatably supported by said knife carrier for transversely cutting said sheet material; drive means operatively connected with said knife means for continuously rotating the same; positioning means operatively connected with said knife assembly for selectively moving the same between a first position in which said knife means severs the moving material, a second position in which said knife means perforates the moving material and a third position in which the knife means makes no contact with the sheet material; and control means for automatically and sequentially actuating said positioning means to move said knife assembly between various ones of said positions in accordance with a predetermined operating sequence.

6. An apparatus for cutting a moving length of sheet material at spaced intervals along its length; a frame assembly including means for supporting the material to be cut as it is moved through the apparatus; a pair of knife assemblies supported adjacent said support means on opposite sides thereof and each comprising a knife carrier pivotally connected with said frame assembly for movement toward and from said support means and a rotary knife rotatably supported by said knife carrier for transversely cutting said sheet material; drive means operatively connected with said knives for continuously rotating the same in opposite directions; positioning means operatively connected with said knife assemblies for selectively moving the same between a first position in which said knives sever the moving material, a second position in which said knives perforate the moving material and a third position in which said knives make no contact with the sheet material; and control means for automatically and sequentially actuating said positioning means to move said knife assemblies between various ones of said positions in accordance with a predetermined operating sequence.

7. In apparatus for cutting a moving length of sheet material at spaced intervals along its length; a frame assembly including means for supporting the material being cut as it is moved through the apparatus; a knife assembly supported adjacent one side of said support means and comprising a knife carrier pivotally connected with said frame assembly for movement toward and from said support means and a rotary knife means rotatably supported by said knife carrier for transversely cutting the sheet material; positioning means operatively connected with said knife assembly for selectively moving the same between a cutting position in which the rotary knife means cuts the moving material and a second position in which said rotary knife means makes no contact with the material; control means for automatically and sequentially actuating said positioning means to move said knife assembly between said positions in accordance with a predetermined operating sequence; drive means operatively connected with said knife means for continuously rotating the same; said drive means including a mechanism whereby the rotational speed of said knife means may be automatically varied during different portions of each cycle of each operation, an adjusting means for said mechanism for changing the variation in the rotational speed of the rotary knife means during the cycle whereby the peripheral speed of the knife means during a cutting operation can be made the same as the speed of the material being cut.

8. In apparatus for cutting a moving length of sheet material at spaced intervals along its length; a frame assembly including means for supporting the material to be cut as it is moved through the apparatus; a knife assembly supported adjacent one side of said support means and comprising a knife carrier pivotally connected with said frame assembly for movement toward and from said support means and a rotary knife means rotatably supported by said knife carrier for transversely cutting the sheet material; positioning means operatively connected with said knife assembly for selectively moving the same between a cutting position in which said rotary knife means severs the moving material, a second position in which said rotary knife means perforates the moving material and a third position in which said rotary knife means makes no contact with the sheet material; control means for automatically and sequentially actuating said positioning means to move said knife assembly between various ones of said positions in accordance with a predetermined operating sequence; drive means operatively connected with said knife means for continuously rotating the same, said drive means including a mechanism whereby the rotational speed of said rotary knife means may be automatically varied during different portions of each cycle of operation; an adjusting means for said mechanism for changing the variation of the rotational speed of said rotary knife means during the cycle whereby the peripheral speed of said rotary knife means during a cutting operation can be made the same as the speed of the material being cut.

9. In apparatus for cutting a moving length of sheet material at spaced intervals along its length; a frame assembly including means for supporting the material to be cut as it is moved through the apparatus; a pair of knife assemblies supported adjacent said support means on opposite sides thereof and each comprising a knife carrier pivotally connected with said frame assembly for movement toward and from said support means and a rotary knife rotatably supported by said knife carrier for transversely cutting said sheet material; positioning means operatively connected with said knife assemblies for selectively moving the same between a first position in which said knives sever the moving material, a second position in which said knives perforate the moving material and a third position in which said knives make no contact with the sheet material; control means for automatically and sequentially actuating said positioning means to move said knife assemblies between various ones of said positions in accordance with a predetermined operating sequence; drive means operatively connected with said rotary knives for continuously rotating the same in opposite directions, said drive means including a mechanism whereby the rotational speed of said rotary knives may be automatically varied during different portions of each cycle of each operation; and adjusting means for said mechanism for changing the variations in the rotational speed of said rotary knives during the cycle whereby the peripheral speed of the knives during a cutting operation can be made the same as the speed of the material being cut.

References Cited by the Examiner

UNITED STATES PATENTS

| | | | |
|---|---|---|---|
| 1,306,499 | 6/1919 | Novick | 83—311 |
| 2,017,366 | 10/1935 | Kling | 83—337 |
| 2,245,442 | 6/1941 | Morgan | 83—324 X |
| 2,289,394 | 7/1942 | Ungar | 83—324 X |
| 2,879,845 | 3/1959 | Haas | 83—311 X |

ANDREW R. JUHASZ, *Primary Examiner.*